US008260641B2

(12) United States Patent
Teicher

(10) Patent No.: US 8,260,641 B2
(45) Date of Patent: *Sep. 4, 2012

(54) SYSTEM AND METHOD FOR LEISURE AND ENTERTAINMENT MERCHANDISING BY ATTRACTION PROVIDERS

(76) Inventor: Mordechai Teicher, Hod Hasharon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/329,367

(22) Filed: Dec. 19, 2011

(65) Prior Publication Data

US 2012/0089464 A1    Apr. 12, 2012

Related U.S. Application Data

(63) Continuation of application No. 11/345,084, filed on Feb. 1, 2006, now Pat. No. 8,090,602, and a continuation-in-part of application No. 10/841,268, filed on May 7, 2004, now Pat. No. 7,305,398.

(60) Provisional application No. 60/653,664, filed on Feb. 17, 2005, provisional application No. 60/496,242, filed on Aug. 15, 2003, provisional application No. 60/479,007, filed on Jun. 15, 2003.

(51) Int. Cl.
*G06Q 99/00* (2006.01)

(52) U.S. Cl. ............. 705/5; 705/1.1; 705/319; 709/203; 709/204

(58) Field of Classification Search ................... 705/1.1, 705/5, 319; 709/203–204
See application file for complete search history.

(56) References Cited

U.S. PATENT DOCUMENTS

| 5,659,731 A | 8/1997 | Gustafson |
| 5,681,046 A | 10/1997 | Lawrence |
| 5,796,395 A | 8/1998 | de Hond |
| 5,884,270 A | 3/1999 | Walker |
| 5,884,272 A | 3/1999 | Walker |
| 5,920,845 A | 7/1999 | Risemberg |
| 5,950,200 A | 9/1999 | Sudai |
| 5,963,951 A | 10/1999 | Collins |
| 5,970,143 A | 10/1999 | Schneier |
| 6,052,122 A | 4/2000 | Sutcliffe |
| 6,058,367 A | 5/2000 | Sutcliffe |
| 6,061,681 A | 5/2000 | Collins |
| 6,085,166 A | 7/2000 | Beckhardt |
| 6,117,011 A | 9/2000 | Lvov |
| 6,203,433 B1 | 3/2001 | Kume |

(Continued)

FOREIGN PATENT DOCUMENTS

WO    WO/00/62266 A3    10/2000

(Continued)

OTHER PUBLICATIONS

Can I Love Thee?; Online Dating Service Gets Patent for Computerized 'Compatibility' System; May 31, 2004; The Times—Transcript. Moncton, N.B., 2 pages.*

(Continued)

*Primary Examiner* — John Hayes
*Assistant Examiner* — Freda A Nelson

(57) ABSTRACT

An attraction provider, such as an attraction operator or attraction agency, is using a system for merchandising commercial attractions to a community of subscribers. The system includes an attraction provider server and an encounter generator server, both cooperating to merchandise the commercial attractions to subscribers, by presenting commercial attractions to subscriber terminals, picking ensembles of subscribers for encounters, assigning an attraction to each ensemble, and booking for the picked ensembles their assigned attractions.

8 Claims, 14 Drawing Sheets

U.S. PATENT DOCUMENTS

| | | |
|---|---|---|
| 6,224,486 B1 | 5/2001 | Walker |
| 6,249,282 B1 | 6/2001 | Sutcliffe |
| 6,272,467 B1 | 8/2001 | Durand |
| 6,480,885 B1 | 11/2002 | Olivier |
| 6,505,167 B1 | 1/2003 | Horvitz |
| 6,549,768 B1 | 4/2003 | Fraccaroli |
| 6,594,502 B1 | 7/2003 | Koester |
| 6,640,229 B1 | 10/2003 | Gilmour |
| 6,641,481 B1 | 11/2003 | Mai |
| 6,647,355 B2 | 11/2003 | Heinberg |
| 6,676,521 B1 | 1/2004 | La Mura |
| 6,683,943 B2 | 1/2004 | Wuelly |
| 6,715,762 B2 | 4/2004 | Simmons |
| 6,735,568 B1 * | 5/2004 | Buckwalter et al. .......... 705/319 |
| 7,085,806 B1 * | 8/2006 | Shapira .......... 709/203 |
| 7,092,952 B1 | 8/2006 | Wilens |
| 7,203,674 B2 * | 4/2007 | Cohen .................. 1/1 |
| 7,401,098 B2 * | 7/2008 | Baker .................. 1/1 |
| 7,613,706 B2 | 11/2009 | Terrill |
| 2001/0033640 A1 | 10/2001 | Wuelly |
| 2001/0034708 A1 | 10/2001 | Walker |
| 2001/0046657 A1 | 11/2001 | Dorn |
| 2001/0047290 A1 | 11/2001 | Petras |
| 2002/0038219 A1 | 3/2002 | Yanay |
| 2002/0040310 A1 | 4/2002 | Lieben |
| 2002/0059252 A1 | 5/2002 | Yamaguchi |
| 2002/0078042 A1 | 6/2002 | Mata |
| 2002/0090911 A1 | 7/2002 | Evans |
| 2002/0090954 A1 | 7/2002 | Tanaka |
| 2002/0103792 A1 | 8/2002 | Blank |
| 2002/0116458 A1 | 8/2002 | Bricklin |
| 2002/0147619 A1 * | 10/2002 | Floss et al. .......... 705/5 |
| 2002/0160338 A1 | 10/2002 | Yirmeyahu |
| 2002/0160339 A1 | 10/2002 | King |
| 2002/0178225 A1 | 11/2002 | Madenberg |
| 2003/0069749 A1 | 4/2003 | Shear |
| 2003/0083544 A1 | 5/2003 | Richards |
| 2003/0087652 A1 | 5/2003 | Simon |
| 2003/0087700 A1 | 5/2003 | Wei |
| 2003/0093405 A1 | 5/2003 | Mayer |
| 2003/0144870 A1 | 7/2003 | Kino |
| 2003/0191673 A1 | 10/2003 | Cohen |
| 2003/0199250 A1 | 10/2003 | Carlton |
| 2004/0009750 A1 | 1/2004 | Beros |
| 2004/0009816 A1 | 1/2004 | Miller |
| 2004/0010608 A1 | 1/2004 | Piccionelli |
| 2004/0120298 A1 | 6/2004 | Evans |
| 2005/0038690 A1 | 2/2005 | Hayes |

FOREIGN PATENT DOCUMENTS

| | | |
|---|---|---|
| WO | WO/01/37232 A1 | 5/2001 |
| WO | WO/03/073304 A1 | 9/2003 |
| WO | WO/2004/010355 A1 | 1/2004 |

OTHER PUBLICATIONS

Yaacov & Sue Deyo, Speed Dating (paperback), 2002, pp. 175-185, HarperCollins, NY, USA.

Paul Coulton et al., Creating entertainment applications for cellular phones,Jul. 2005, ACM Source Computers in Entertainment (CIE), vol. 3, Issue 3, pp. 1-12.

Steffan Bjork et al., Designing Ubiquitous Computers Games—A Report from a Workshop Exploring Ubiquitous Computing Entertainment, Dec. 2002,Springer-Verlag London, UK, vol. 6, Issue 5-6, pp. 443-458.

Poniewozik, James. "Back in the Land of Ozz." Nov. 25, 2002. Time, vol. 160 Issue 22, p. 84.

Can I Love Thee?; Online Dating Service Gets Patent for Computerized 'Compatibility System; May 31, 2004; The Times—Transcript. Moncton, N.B., 2 pages.

* cited by examiner

*145P*

| WISHING TO GO OUT | |
|---|---|
| | TIMES |
| FOR A FEW HOURS THIS WEEK | 3 |
| FOR WEEKEND BREAKS IN TWO MONTHS | 2 |
| FOR LONG JOURNEYS THIS YEAR | 1 |
| | |
| PRIORITIES | |

| | 1ST | 2ND | 3RD |
|---|---|---|---|
| PARTNER(S) | | X | |
| ATTRACTION | X | | |
| TIMING | | | X |

| ANNA | RACHEL | SUZY | PETER | PAUL | JOHN | JIM |
|---|---|---|---|---|---|---|
| 3 | 8 | 3 | 7 | 6 | 5 | 2 |

| GOING OUT WITHIN THE NEXT 7 DAYS (PRIORITY POINTS 0-9) | | | | | |
|---|---|---|---|---|---|
| | MORNING | LUNCH | AFTERNOON | EVENING | NIGHT |
| SUN | | | 8 | | |
| MON | | | | | |
| TUE | | 4 | | | |
| WED | | | | | |
| THU | | 4 | | | |
| FRI | | | | 9 | |
| SAT | | | | 9 | |

| WEEKEND BREAKS WITHIN TWO MONTHS |
|---|
| MARCH 19-20 (9) |
| APRIL 23-24 (4) |

| LONG JOURNEYS WITHIN THIS YEAR |
|---|
| JUNE 20-30 (9) |
| AUGUST 7-20 (3) |

| # | ATTRACTION TYPE | ATTRACTION DETAILS | RANK | SPECIFIC PREFERENCES COMPANY SIZE | SPECIFIC PREFERENCES PARTICULARS |
|---|---|---|---|---|---|
| 1 | MOVIE | COMEDY | 4 | 2-4 | PROMOTIONAL |
| 2 | MOVIE | FANTASTIC FOUR | 5 | 2-4 | |
| 3 | MOVIE | HARRY POTTER | 9 | 2 | IN VILLAGE |
| 4 | CAFÉ | | 5 | 2 | |
| 5 | CAFÉ | ANDY'S | 9 | 4-6 | |
| 6 | CAFÉ | GARDEN | 0 | | |
| 7 | JOURNEY | SATURDAY IN THE COUNTRY | 4 | | |
| 8 | JOURNEY | SAT & SUN IN THE MOUNTAINS | 9 | | |
| 9 | JOURNEY | ALASKA: 2 WEEKS IN JUL | 4 | | |

FIG. 4E — 145A / 145R / 145T / 145M

| # | ATTRACTION TYPE | ATTRACTION DETAILS | RANK DEFLT | RANK ANNA | RANK RACHEL | RANK SUZY | RANK PETER | RANK PAUL | RANK JOHN | RANK JIM | TIMING DATES | TIMING HOURS | SPECIFIC PREFERENCES COMPANY SIZE | SPECIFIC PREFERENCES PARTICULARS |
|---|---|---|---|---|---|---|---|---|---|---|---|---|---|---|
| 1 | MOVIE | COMEDY | 4 | | | | | | 9 | | WED | EARLY EVE | 2-4 | PROMOTIONAL |
| 2 | MOVIE | FANTASTIC FOUR | 5 | | | | | | | | WED | LATE EVE | 2-4 | |
| 3 | MOVIE | HARRY POTTER | 9 | | | | | | | | WED | AFTERNOON | 2 | IN VILLAGE |
| 4 | CAFÉ | | 5 | | | | | | | | EVERYDAY | LUNCH; EVE | 2 | |
| 5 | CAFÉ | ANDY'S | 9 | 0 | 0 | 0 | | | | | FRIDAY | EVE | 2 | |
| 6 | CAFÉ | GARDEN | 0 | | | | | | | | | | | |
| 7 | JOURNEY | SATURDAY IN THE COUNTRY | 4 | | | | | | | | APR-MAY | | | |
| 8 | JOURNEY | SAT & SUN IN THE MOUNTAINS | 9 | | | | | | | | ASAP | | | |
| 9 | JOURNEY | ALASKA: 2 WEEKS IN JUL | 4 | | | | | | | | END JULY | | | |

|        | MARY | ANNA | RACHEL | SUZY | PETER | PAUL | JOHN | JIM |
|--------|------|------|--------|------|-------|------|------|-----|
| MARY   | -    | 3    | 8      | 3    | 7     | 6    | 5    | 2   |
| ANNA   | 2    | -    | 5      | 8    | 4     | 3    | 3    | 9   |
| RACHEL | 0    | 2    | -      | 6    | 9     | 2    | 7    | 8   |
| SUZY   | 4    | 3    | 1      | -    | 1     | 6    | 3    | 5   |
| PETER  | 3    | 8    | 4      | 3    | -     | 4    | 7    | 5   |
| PAUL   | 4    | 8    | 4      | 2    | 1     | -    | 9    | 3   |
| JOHN   | 9    | 6    | 3      | 6    | 0     | 7    | -    | 6   |
| JIM    | 6    | 8    | 3      | 6    | 5     | 6    | 8    | -   |

FIG. 11A

|        | ANNA | RACHEL | SUZY | PETER | PAUL | JOHN | JIM |
|--------|------|--------|------|-------|------|------|-----|
| TO     | 3    | 8      | 3    | 7     | 6    | 5    | 2   |
| FROM   | 2    | 0      | 4    | 3     | 4    | 9    | 6   |
| MUTUAL | 5    | 0      | 7    | 10    | 10   | 14   | 8   |

FIG. 11B

|        | SUN | MON | TUE | WED | THU | FRI | SAT |
|--------|-----|-----|-----|-----|-----|-----|-----|
| MARY   | 0   | 0   | 8   | 0   | 0   | 9   | 4   |
| ANNA   | 7   | 0   | 0   | 0   | 1   | 0   | 0   |
| RACHEL | 0   | 0   | 2   | 4   | 0   | 9   | 0   |
| SUZY   | 2   | 0   | 3   | 0   | 0   | 9   | 4   |
| PETER  | 0   | 6   | 6   | 0   | 0   | 0   | 2   |
| PAUL   | 0   | 0   | 0   | 0   | 0   | 0   | 2   |
| JOHN   | 0   | 0   | 5   | 0   | 5   | 2   | 4   |
| JIM    | 0   | 0   | 0   | 4   | 9   | 6   | 0   |

FIG. 12A

|        | SUN | MON | TUE | WED | THU | FRI | SAT |
|--------|-----|-----|-----|-----|-----|-----|-----|
| ANNA   | 0   | 0   | 0   | 0   | 0   | 0   | 0   |
| RACHEL | 0   | 0   | 10  | 0   | 0   | 18  | 0   |
| SUZY   | 0   | 0   | 11  | 0   | 0   | 18  | 8   |
| PETER  | 0   | 0   | 14  | 0   | 0   | 0   | 6   |
| PAUL   | 0   | 0   | 0   | 0   | 0   | 0   | 6   |
| JOHN   | 0   | 0   | 13  | 0   | 0   | 11  | 8   |
| JIM    | 0   | 0   | 0   | 0   | 0   | 15  | 0   |

| | FANTASIA | HARRY POTTER | ANDY'S CAFÉ | GARDEN CAFÉ |
|---|---|---|---|---|
| MARY | 1 | 2 | 6 | 5 |
| ANNA | 4 | 3 | 7 | 7 |
| RACHEL | 5 | 8 | 8 | 6 |
| SUZY | 0 | 7 | 4 | 3 |
| PETER | 1 | 1 | 7 | 1 |
| PAUL | 7 | 0 | 6 | 0 |
| JOHN | 0 | 8 | 3 | 8 |
| JIM | 8 | 3 | 9 | 1 |

FIG. 13B

| | FANTASIA | HARRY POTTER | ANDY'S CAFÉ | GARDEN CAFÉ |
|---|---|---|---|---|
| ANNA | 5 | 5 | 13 | 12 |
| RACHEL | 6 | 10 | 14 | 11 |
| SUZY | 0 | 9 | 10 | 8 |
| PETER | 2 | 3 | 13 | 6 |
| PAUL | 8 | 0 | 12 | 0 |
| JOHN | 0 | 10 | 9 | 13 |
| JIM | 9 | 5 | 15 | 6 |

FIG. 14A

| PARTNER | SCORING | | | | | | | |
|---|---|---|---|---|---|---|---|---|
| | | TIMING | | | | | | |
| | | SUN | MON | TUE | WED | THU | FRI | SAT |
| ANNA | 5 | 0 | 0 | 0 | 0 | 0 | 0 | 0 |
| RACHEL | 0 | 0 | 0 | 10 | 0 | 0 | 18 | 0 |
| SUZY | 7 | 0 | 0 | 11 | 0 | 0 | 18 | 8 |
| PETER | 10 | 0 | 0 | 14 | 0 | 0 | 0 | 6 |
| PAUL | 10 | 0 | 0 | 0 | 0 | 0 | 11 | 8 |
| JOHN | 14 | 0 | 0 | 13 | 0 | 0 | 15 | 0 |
| JIM | 8 | 0 | 0 | 0 | 0 | 0 | 0 | 0 |

| | RANKING | | | |
|---|---|---|---|---|
| | FANTASIA | HARRY POTTER | ANDY'S CAFÉ | GARDEN CAFÉ |
| ANNA | 5 | 5 | 13 | 12 |
| RACHEL | 6 | 10 | 14 | 11 |
| SUZY | 0 | 9 | 10 | 8 |
| PETER | 2 | 3 | 13 | 6 |
| PAUL | 8 | 0 | 12 | 0 |
| JOHN | 0 | 10 | 9 | 13 |
| JIM | 9 | 5 | 15 | 6 |

FIG. 14B

| # | POLICY | | | ENCOUNTER | | |
|---|---|---|---|---|---|---|
| | 1ST | 2ND | 3RD | ENSEMBLE | ATTRACTION | TIMING |
| 1. | SCORING | RANKING | TIMING | MARY & JOHN | GARDEN CAFÉ | TUESDAY |
| 2. | SCORING | TIMING | RANKING | MARY & JOHN | GARDEN CAFÉ | TUESDAY |
| 3. | RANKING | SCORING | TIMING | MARY & JIM | ANDY'S CAFÉ | FRIDAY |
| 4. | RANKING | TIMING | SCORING | MARY & JIM | ANDY'S CAFÉ | FRIDAY |
| 5. | TIMING | SCORING | RANKING | MARY & SUZY | ANDY'S CAFÉ | FRIDAY |
| 6. | TIMING | RANKING | SCORING | MARY & SUZY | ANDY'S CAFÉ | FRIDAY |

SYSTEM AND METHOD FOR LEISURE AND ENTERTAINMENT MERCHANDISING BY ATTRACTION PROVIDERS

CROSS-REFERENCE TO RELATED APPLICATIONS

This application is a continuation of U.S. patent application Ser. No. 11/345,084, entitled "METHOD AND APPARATUS FOR LEISURE & ENTERTAINMENT MERCHANDISING" filed on Feb. 1, 2006 now U.S. Pat. No. 8,090,602 ("REF 1"). REF 1 claims the benefits of U.S. Provisional Patent Application No. 60/653,664, entitled "METHOD AND APPARATUS FOR ARRANGING SOCIAL ENCOUNTERS", filed on Feb. 17, 2005. REF 1 is a continuation-in-part of U.S. patent application Ser. No. 10/841,268, entitled "APPARATUS AND METHOD FOR MANAGING SOCIAL GAMES" filed on May 7, 2004, now U.S. Pat. No. 7,305,398 ("REF 2"). REF 2 claims the benefits of U.S. Provisional Patent Application No. 60/496,242, filed Aug. 15, 2003, and U.S. Provisional Patent Application No. 60/479,007, filed Jun. 15, 2003. REF 1 is related to U.S. patent application Ser. No. 11/344,816 entitled "METHOD AND APPARATUS FOR ARRANGING SOCIAL MEETINGS", filed on Feb. 1, 2006, now U.S. Pat. No. 7,761,386. All above references are incorporated herein in their entirety as if fully set forth herein.

BACKGROUND OF THE INVENTION

1. Field of the Invention

The present invention relates to computerized methods and systems for electronic commerce, and in particular to such methods and systems used for merchandising leisure & entertainment attractions over public data networks.

2. Description of Related Art

Leisure & entertainment encompasses major consumer industries: movies, shows, concerts, operas, sports events, dining, golf, fitness, yachting, fishing, resorts, cruises, tours, museums, exhibitions, lectures, shopping, and many other commercial attractions.

Sales of leisure & entertainment attractions are highly affected by the social motive of prospective customers. The social motive can be either a driver or inhibitor of the consumption of leisure & entertainment attractions: The social motive drives consumption when one wants to meet an exiting friend, get to know a new friend, or find a soul mate, and would visit with that person a movie, restaurant or baseball game; The social motive inhibits consumption when one wants to go out to a movie, restaurant or baseball game, but gives up for lack of a companion.

Although the Internet and the media provide ample leisure & entertainment information with respect to where to go and what to do, the motivated individual, couple or family still has the burden of arranging with whom to meet, for what attraction and when. While the convenience aspect of "when" can benefit from some recent innovations in calendar-coordination (see, for example, U.S. Pat. Nos. 6,085,166 and 6,505,167B1; and U.S. patent application publication 2005/0038690A1), the socially-critical aspects of with whom to meet and for what attraction, have so far been ignored, except for the related parent U.S. patent application Ser. No. 10/841,268.

Most importantly, the correlation between sales of leisure & entertainment attractions and the social motive that drives their consumption has not been recognized by the leisure & entertainment industry. In fact, the industry continues to push its products into the consumer marketplace through a tremendous investment in advertising, and disregards the alternative of encouraging prospective customers to pull such products by addressing their social motives.

There is thus an unfulfilled need for methods and systems for addressing the social motives that drive leisure & entertainment consumption.

BRIEF SUMMARY OF THE INVENTION

The present invention offers a comprehensive solution for promoting electronic commerce within the leisure & entertainment industries, by nurturing and facilitating the related social motives. From the commercial point of view, the present invention will increase the sales of leisure & entertainment attractions by motivating people to go out and meet others at such attractions, and by facilitating the social arrangements for those who are already motivated to go out and seek a companion. From the social point of view, the present invention contributes to the well-being of individuals, couples, and families by encouraging and enabling them to spend more quality time with existing or new friends.

The present invention offers a computer-assisted solution for facilitating the arrangement of social meetings at commercial leisure & entertainment attractions. Users of the present invention enter wish-lists, which specify and prioritize what attractions they want to visit, with whom they prefer going out, and their preferred schedule for outings. A computerized encounter generator then scans the wish-lists, seeking matches for generating encounters. An encounter specifies an ensemble of two or more users, an attraction assigned for them, and a schedule for getting together there. The ensemble members are then presented with the encounter details and are preferably offered assistance with reservations and/or ticketing.

The audiences for the present invention are categorized by their ultimate goal in seeking social meetings:

Entertainment seeker: an individual, couple, or family who wishes to go out for a good time with others, ranging from existing friends to compatible strangers.

Friend seeker: an individual, couple, or family who wishes to get acquainted with others in order to make friends; for example, people who have relocated to another city may look for new friends. Prospective friends can be individuals from both sexes, established couples, or families.

Mate seeker: a single who wishes to meet other singles in order to identify, approach, and develop mutual affection with a soul mate of their selected gender.

Entertainment seekers can be further characterized by their short-term motivation. There are those who have an urge to go out at a specific time, and are not particularly selective with respect to the companion or the attraction. There are those who want to go out with a particular companion, and are open regarding the attraction. And there are those who want to attend a specific attraction and are looking for a companion.

It is noted that the above classification is not mutually-exclusive. For example, one may go on a singles cruise with several goals: making friends from both sexes, seeking a soul mate of the selected gender, having good time with others, and identifying a companion for a journey. A couple who are relocating to another town may be invited to join and get to know an established company of friends who like going out to shows together. A family may invite two other families to go to a concert together, and may spark a new friendship between those two other families that did not know each other before. Sometimes this additional effect is desirable, such as when making new friends while hoping to meet a soul mate among them. In other cases such developments are unexpected side-effects.

DEFINITIONS

The terms "commercial attraction" and "attraction" herein interchangeably denote a specification of the content of and/or the place, and usually also the time or times of operation, for a commercial leisure & entertainment event or facility for hosting a face-to-face meeting. An attraction can be the reason for the meeting, or just a nucleus around which a meeting is crystallized. Non-limiting examples for an attraction are: a café, restaurant, pub, bar, theater, movie, zoo, amusement park, concert hall, sports arena, opera, exhibition, fair, baseball match, shopping mall, gym, bookstore, a domestic or international tour, lecture, golf club, singles workshop, etc. Any place or event that can serve as a meeting opportunity and is offered by a commercial entity is considered an attraction. Attractions can be defined in various degrees of specificity; for example: a restaurant, an Italian restaurant, or a specific Italian restaurant; a movie, a comedy, a specific comedy, or a specific comedy at a specific movie theater. The degree of specificity depends on the motivation for and circumstances of the meeting, and may leave the particulars to be negotiated and decided-upon among the matched parties. Sometimes two or more attractions can be appended to become another attraction; for example, it may become customary to follow a visit to a movie by a visit to a café—thus making the combination of movie+café an attraction by itself.

The term "attraction operator" relates to a business that operates an attraction, such as a movie theater, a movie theater chain, a café, a restaurant or a zoo; the term "attraction agency" relates to a reseller of tickets and/or a facilitator of reservations, such as a ticket booth or a travel agent operating over the Internet or mobile network; the term "attraction provider" covers both an attraction operator and attraction agency.

The terms "subscriber", "participant", "member" and "user" herein interchangeably denote an individual person, an established couple, or a family, registering to participate in encounters according to the present invention, for any of the motivations described above, i.e. seeking entertainment, friends, or a mate. A person may register as more than one participant; for instance, one may register as an individual seeking new partners for golf, as a member of a couple that seeks the company of other couples for going out to movies, and as a member of a family that seeks the company of other families for a journey. The term "couple" herein relates to either a married couple or two mates, participating as a unit in encounters. The term "family" herein relates to one or two parents together with at least one child participating as a unit in encounters. A subscriber that is a couple or family will register as one subscriber having a single wish-list agreed upon internally.

The term "community" herein relates to all subscribers registered with a certain implementation of the present invention. A community may be homogenous, for example the students of a certain college or a group of singles aged 30-40 seeking a mate; or it can be heterogeneous, open to various types of subscribers and goals—for example singles, couples and families of all ages and all interests.

The term "forum" herein denotes a subset of a community that is optionally formed to narrow the focus of a subscriber when scoring other subscribers, as well as for restricting the access of other subscribers to that subscriber. A "closed forum" is a relatively-homogenous group of subscribers that can be mutually selected for meetings. A closed forum can be the entire community, for example in a relative-small community of college students, or be a homogeneous community-subset selected on the basis of mutual compatibility of the forum's members, taking into account member type (individual, couple or family), age, goals, interests, geographic location, etc. A closed forum can also be made up of an existing company of friends, who wish to use an embodiment of the present invention for arranging meetings within their company. In some cases, especially for mate seekers and friend seekers, a forum can be made intentionally compact to facilitate the acquaintance and interaction among its members. A "subscriber's circle" or "circle" is a specific type of forum that is a personal forum of a certain subscriber; thus, a circle consists of that certain subscriber along with other subscribers that are compatible with and are made accessible to that subscriber on a mutual basis; for example, a subscriber and ten friends he has identified within the community or has motivated them to join the community; since friendship is not transitive (i.e. a friend-of-a-friend is not necessarily a friend), circles will often not coincide (i.e. not form a closed forum), unless a company of mutual friends selects to establish a closed forum. Another example for a circle is when friend-seeking subscribers who initially do not know each other are matched by a community leader according to predefined criteria, such as age, education and residence addresses; Peter who is 30-year old, for example, can be matched with Jim aged 25 and John aged 35, but Jim and John cannot be matched with each other since their age difference is too high; thus, under an embodiment that supports circles, a community organizer for friend seekers can assign Jim and John to the circle of Peter, while both are excluded from the circle of each other. In the case of mate seekers, a circle will typically consist of the subscriber along with members of the selected gender. A forum can be updated by adding or deleting members; this may occur because of member initiatives, or by the initiative of a community or forum leader wishing to refresh membership, especially in case of mate seekers and friend seekers.

The term "ensemble" herein denotes two or more subscribers that are selected to meet for visiting or participating in an attraction.

The term "schedule" relates to a specific date and time for visiting an attraction. Sometimes a schedule is implicit in the attraction (for example, in case of a unique concert); or it can be specified next to an attraction definition (for example, if a subscriber seeks to go out to the movie "Harry Potter" on the coming Wednesday at 8:00 p.m.); or it can be specified separately, irrespective of the attraction specifics, for expressing the time preferences of a subscriber for going out.

The term "encounter" herein denotes a meeting at an attraction arranged by an embodiment of the present invention. Typically, an encounter defines a combination of an ensemble, attraction and schedule. Thus, an encounter can be formed of two individuals that are meeting tonight for a movie followed by a visit to a café, three couples meeting at the opera on Tuesday, or four families joining for a two-week journey to Alaska in July. While defining an ensemble is mandatory for an encounter, the schedule, attraction or particulars thereof can, in some embodiments or instances, be predefined or left to be decided upon among the ensemble's members, preferably within a list of predefined options.

The following terms relate to how subscribers express their preferences and constraints with respect to encounters. The term "score" or "scoring" herein relates to a subscriber expressing his, her or their relative level of interest for another subscriber. The term "rank" or "ranking" herein relates to a subscriber expressing his, her or their relative level of interest for an attraction. The term "timing" relates to a subscriber specifying schedule preferences, i.e. preferences for dates and/or hours for a meeting. The term "policy" herein relates to a subscriber specifying how often he, she or they wish to go out, and/or the priority among assigning an attraction, partners and schedule; for instance, one's policy may specify going out twice a week and have first priority for the partner selection, second priority for convenient schedule and third priority for the attraction specifics. The term "miscellaneous preference" herein relates to a subscriber expressing constraints and priorities with respect to attraction details that are not covered by the attraction specifications, and are optionally taken into account to fine-tune the encounter specifics; for example, if the attraction is specified just as restaurant, the subscriber may add a preference of Italian restaurant, a specific Italian restaurant, or a corner table; similarly, for an attraction plainly specified as a movie, the subscriber may specify a preference for a comedy, a certain comedy, or preferred seats.

The term "wish-list" herein denotes an input from a subscriber that is entered into an embodiment of the present invention, for identifying, i.e. introducing and/or updating, the subscriber's preferences and/or constraints with respect to meetings. A wish-list introduces or updates any combination or sub-combination (i.e. combination of a subset) of scoring subscribers, ranking attractions, specifying timing, defining a policy, or expressing miscellaneous preferences. Typically, the wish-list addresses with whom the subscriber prefers to meet, what attractions are most desirable, what schedule is acceptable or preferred, how often the subscriber wants to go out, how to prioritize among partners, attraction and schedule, and what other miscellaneous preferences are. However, a wish-list may omit some of these details, to be predefined by a community doctrine or negotiated among ensemble members. The wish-list is typically dynamic, changing with experience, mood, new personal constraints, new acquaintances and new attraction offers. Preferably, parts of the wish-list, and especially the scores, are kept secret, since they include sensitive personal preferences regarding others.

The term "doctrine & rules" or "doctrine" herein relates to a specific variation of operational rules and algorithms that affect the operation of the present invention. The doctrine is adapted to specific goals, audience, culture and taste of the targeted participants.

The term "booking" herein related to reservation and/or ticketing for an attraction.

The General Process

The process of arranging social meetings at commercial attractions in accordance to the present invention is executed by a system generating encounters in response to the wish-lists received from subscribers. The system aims at matching alike wishes while balancing conflicting priorities. Optional preparatory and conclusive steps are dependent on the participants' goal. The following steps relate to a generalized process, and require tweaking for mate seekers, friend seekers and entertainment seekers:

- Registration: individuals, couples or families need to register with a community of users of the present invention in order to become subscribers. In some communities, one may have multiple registrations, for example register as an individual, a member of a couple and a member of a family. In other communities, one may be registered by default, e.g. by belonging to a student association or another group that has been formed for another purpose and joins as a community for using an embodiment of the present invention.
- Forum derivation: this step is optional and can be useful if the community is too large or too heterogeneous for effective operation. In some embodiments it is executed by identifying a circle for each subscriber.
- Introductory encounter(s): in case of mate seekers and friend seekers who are initially-unfamiliar with each other, one or more optional introductory meetings acquaint participants with each other.
- Primary encounters: multiple encounters are arranged in response to the dynamic wish-lists of the subscribers.
- Conclusion: in some embodiments of the present invention for mate seekers and friend seekers, after a certain amount of primary encounters, a participant has either reached the sought goal or should better look for another chance in another forum.

Summary of Encounter Generation

The present invention is of a method, apparatus and system for utilizing computers to merchandise commercial attractions, by facilitating and coordinating the social and organizational aspects of outings, assisting subscribers from a community of subscribers in deciding where to go, with whom and when. Subscribers can be individuals, couples or families, seeking entertainment, new friends, or a soul mate.

An encounter generator communicates, for example through the Internet or a cellular network, with attraction provider servers that can be servers of attraction agencies such as an Internet ticket booth or a travel agent, or servers, that can also be manually-operated terminals, of attraction providers such as a movie theater or chain, restaurant, or café. This communication is made for receiving attractions to be presented to the subscribers for ranking. The encounter generator then communicates, for example through the Internet or a cellular network, with subscriber terminals, for example personal computers or cellular phones, for presenting the attractions and receiving a wish-list from each participating subscriber from a plurality of subscribers from the community. The plurality can be smaller than the community, because not all community subscribers need to generate or receive communication in every operation session; also, the plurality can be intentionally limited, in certain embodiments or instances, to the subscribers who belong to a certain forum within the community and are selected to participate in a current session of operation. The presentation of the attractions to a subscriber is optionally and preferably limited to only attractions that a relevant to that subscriber, filtered by geography, age and interests expressed by the subscriber. The wish-list of each participating subscriber identifies his/her/their preferences for a meeting, expressed as a combination or sub-combination of all or a subset of: ranking the level of interest of the participating subscriber for attractions of interest from the commercial attractions, scoring the level of interest of the participating subscriber for meeting other relevant subscribers from the community (the relevant subscribers being, for example, those of the selected gender belonging to a forum of the participating subscriber who seeks a soul mate, or those who belong to the subscriber's circle), and timing the preferred schedules of said participating subscriber for having encounters. While often the wish-list includes all three of ranking, scoring and timing, in some cases, one or two factors may be missing, because they are determined by default, or are not taken into account during encounter generation, or are left to be negotiated among matched parties. Different subscribers may have different parts of their wish-lists missing or incomplete.

The encounter generator then processes the current wish-lists for generating encounters by seeking matches among the ranks, scores and timings of the participating subscribers.

Based on such matches, an encounter is generated by picking an ensemble of (at least two) subscribers who positively scored each other, assigning an attraction that was positively ranked by the ensemble's members, and selecting a schedule that satisfies the timing preferences of the ensemble's members. The encounter generator then preferably repeats the encounter generation process for other encounters for other ensembles.

Picking an ensemble is often made by taking into account, at the highest priority, the mutual scoring of the subscribers. However, in some embodiments or instances, depending on the policies in effect, picking can be determined primarily in accordance to attraction ranking or schedule timing preferences rather than subscriber scoring. This may happen, for example, when the policy of a forum or of individuals aims at giving higher priority to where one goes or when, over with whom. Thus, A and B may be picked by their wish-lists as an ensemble because both want very much to visit a certain concert, and attending that concert is more important to them (according to their policies) than the fact that other subscribers are scored higher by each one of them. Accordingly, picking an ensemble in response to the wish-lists of the plurality can be dominated by the various ingredients of the wish-list. It will be also noted that even if scoring is missing in some or all subscribers' wish-lists, subscribers can still be matched and picked for visiting an attraction by their common attraction preferences (i.e. by their common ranking inputs).

While picking an ensemble in response to the wish-lists of the participating subscribers from the plurality is mandatory for an encounter, any of the other encounter ingredients, i.e. assigning an attraction and selecting a schedule, can in some embodiments or instances be determined arbitrarily by the encounter generator or require additional input from the ensemble's members, either because the missing factor is being decided by predefined rules (for example, the plurality of subscribers is from a forum that meets every Tuesday evening, or the attraction is predefined as visiting the gym, or a restaurant is arbitrarily selected by the encounter generator according to seats availability), or because data is missing in the respective wish-lists or fails to match, and is then left to be negotiated among the ensemble members, and then preferably reported back to the encounter generator for completing the encounter toward booking. Also, each of the acts of picking an ensemble, assigning an attraction and selecting a schedule, can include offering more than one choice by the encounter generator (for exampling, choosing between two movies have been positively ranked by all ensemble members, or deciding between two movies where the ensemble members initially failed to agree on even one) and getting feedback from the subscribers for finalizing that act. After a fully- or partially-complete encounter is generated, the encounter generator communicates with the terminals of the ensemble's subscribers and presents the encounter details.

After an encounter has been assigned, the encounter generator preferably provides a booking service, for example by facilitating communication between the ensemble's subscribers and the respective attraction provider servers, for completing reservations and/or ticketing; this is done by either offering the subscriber an option to make the reservation/ticketing through a communication session with the encounter generator, or by providing a link that refers the subscriber to the respective attraction server for a direct buyer-seller transaction. In some embodiments, the attraction server and the encounter generator are integrated within the same physical server or computer system, and then the functionalities described above are executing between different logical processes running within the same computing environment.

In some embodiments, the wish-list of subscribers includes a policy that indicates how often the subscriber wants to go out (e.g. twice a week), and/or what is the priority among who, where and when the subscriber wants to meet (i.e. the priority for taking into account scoring, ranking and timing, when picking an ensemble). The encounter generator preferably takes such policies into account for generating encounters.

A special case of interest is when employing the method, apparatus and system of the present invention for running dating encounters for singles, or for arranging new acquaintances for individuals who wish to make new friends. In this case, participants may feel embarrassed or unsafe in having a one-on-one meeting with a stranger, and would feel more comfortable in having initial meetings in a group setting, and move to couple meetings only after having developed interest and confidence in others during group meetings. The wish-list's scoring then includes not only the level of interest in other subscribers, but also an indication whether the present subscriber agrees to meet each of his/her scored subscribers in a couple setting. The encounter generator's processor is then programmed to pick an ensemble of two subscribers for a couple encounter only if both respective participants have approved each other for a couple encounter; otherwise the processor will ensure that the picked ensemble will include at least three subscribers for a group setting.

BRIEF DESCRIPTION OF SEVERAL VIEWS OF THE DRAWINGS

The present invention will be understood and appreciated more fully from the following detailed description, taken in conjunction with the drawings in which:

FIGS. 4A-E are tables demonstrating exemplary contents of subscribers' wish-lists.

FIGS. 11A-B are tables demonstrating an exemplary scoring method.

FIGS. 12A-B are tables demonstrating an exemplary timing method.

FIGS. 13A-B are tables demonstrating an exemplary ranking method.

FIG. 14A is an exemplary table of scoring, timing and ranking consolidated into a single table.

FIG. 14B is an exemplary table demonstrating the policy concept and how it affects encounter selection.

DETAILED DESCRIPTION OF THE INVENTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Overview

Figure 1:
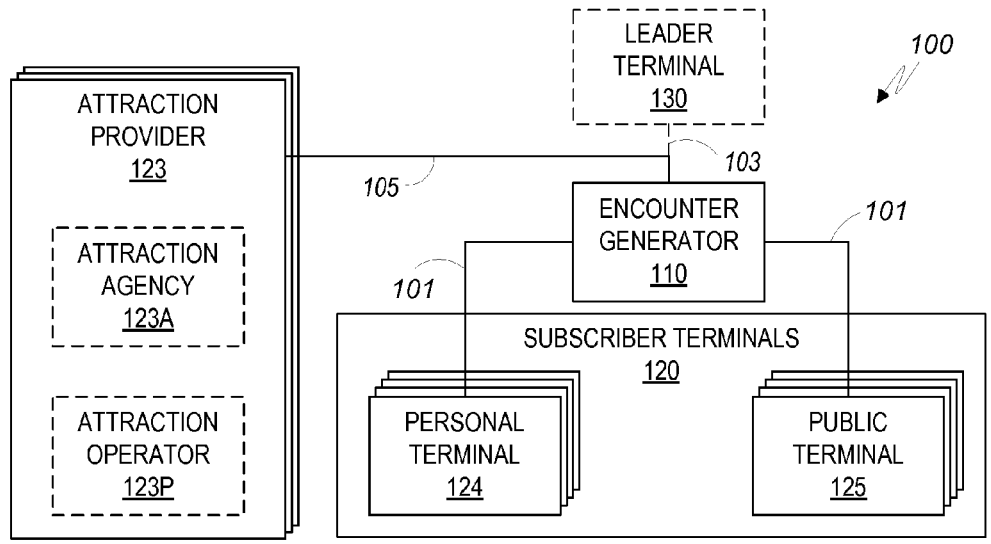
FIG. 1 is a simplified block diagram describing the general architecture of a system according to a preferred embodiment of the present invention.
Figure 2:
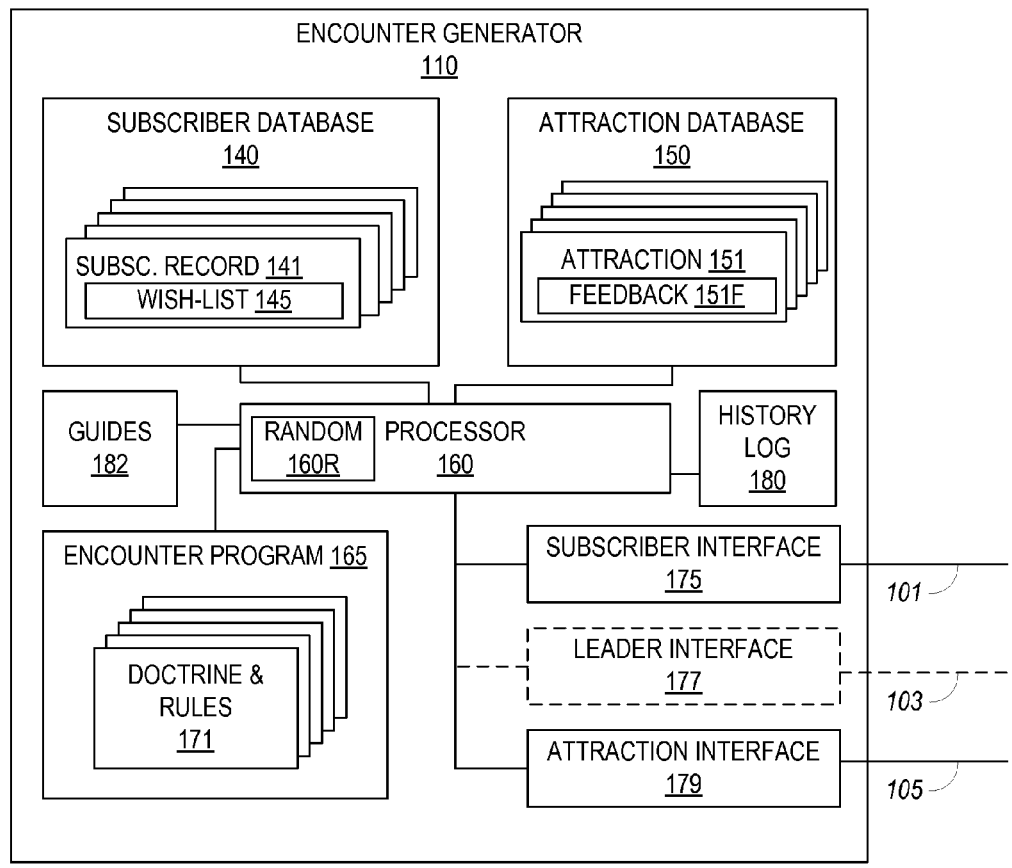
FIG. 2 is a simplified block diagram zooming into the encounter generator of FIG. 1.

Reference is made to FIG. 1, which describes a general exemplary preferred embodiment 100 of a system constructed in accordance to the present invention. Encounter generator 110 is the heart of the system; it is a computer that includes subscriber wish-lists and attraction offers, processing means to generate encounters in response to the wish-lists, and communication interfaces. The term "computer" herein denotes any data storage and processing device or system, including, but not limited to, personal computers (PCs), data networks, Internet servers and servers of cellular telephony. Subscriber terminals 120 include personal terminals 124 and/or public terminals 125. A personal terminal 124 is a device that is personal to a subscriber for allowing data entry into and/or data reception from encounter generator 110. Examples of personal terminal 124 include, but are not limited to, cellular telephones with Internet and/or Short Messaging Service (SMS) or Dual Tone Modulation Frequency (DTMF) capability, land telephones, video-phones, Internet-enabled set-top-box, one-way and two-way pagers, and personal computers of all types and sizes connectable to the Internet, to a cellular telephony network, to a cellular wireless data network, or to a local wireless network using short-range IR or RF communication. A public terminal 125 is any input and/or output device accessible to more than one subscriber and allowing data entry into and/or data reception from encounter generator 110. Non-limiting examples include a public computer allowing a subscriber to communicate with encounter generator 110 via the Internet, a local network or a cellular network, by identifying himself or herself by username and password (or an alternative user authentication means); a video screen; a video projector; a printer printing encounter details; or a public address system used to announce encounters within a party. It will be appreciated that in some embodiments a subscriber may use various communication options, for example enter his/her personal record via a home PC 124 connected to the Internet, update his/her wish-list by sending an SMS or DTMF message from cellular telephone 124 to encounter generator 110, and read the details of his/her next encounter on a large video screen 125 within a party site. An optional leader terminal 130 is used by a forum or community leader in embodiments where a human is involved in deriving forums from a community or in assigning encounters. One or more commercial attraction provider servers 123, each being either a server 123P of an attractions operator (e.g. a movie theater or a café) or a server 123A of an attraction agency (e.g. a ticket or travel agency), are linked to encounter generator 110 in order to offer commercial attractions to the subscribers, on a regular or promotional basis, and preferably also for checking attraction availability and/or arranging booking (i.e. reservations and/or ticketing). In smaller implementations, an attraction server 123 can be reduced to an attraction operator terminal 123 that serves a smaller attraction operator for feeding attraction offers into attraction database 150 (FIG. 2). Communication links 101, 103 and 105 are network-based or direct data links to connect encounter generator 110 to the subscriber terminals 120, leader terminal 130, and commercial attraction provider servers 123, respectively.

Reference is now made to FIG. 2, which zooms into encounter generator 110 of FIG. 1. A processor 160 includes a computer CPU (central processing unit) running an encounter program 165 which generates encounters by assigning attractions from an attraction database 150 to subscribers from a subscriber database 140, according to subscriber wish-lists 145 included in subscriber's records 141 and to a current doctrine and rules 171. Processor 160 preferably includes a random number generator 160R for including a random factor in the selection of encounter participants and/or attractions, which facilitates selections of attractions and participants and protects the privacy of subscribers by masking their wish-lists; thus, from an encounter assigned to a subscriber one cannot determine with certainty whether the associated attraction or partner were preferred in that subscriber's wish-list or just selected randomly by processor 160 using random number generator 160R. Such privacy is especially important during the process of seeking a mate or friends, or when preferring the company of a certain friend to that of another. Subscriber database 140 includes, for each subscriber, subscriber's record 141, entered by the subscriber upon subscription and being updated regularly, in particular to refresh the subscriber's wish-list 145 in response to the results of recent encounters or to recent updates to the subscriber database 140 or attraction database 150. The subscriber inputs for updating subscriber database 140 are made using subscriber terminals 120 and are received through subscriber interface 175 and communication link 101. Subscriber interface 175 is also operated to present the encounters generated by processor 160 by sending encounter details to subscriber terminals 120 via communication link 101. Attraction database 150 includes attractions 151, received from commercial attraction provider servers 123, communication link 105 and attraction interface 179. Feedback field 151F is optionally included in the records 151 of attraction database 150, for recording opinions and advice from subscribers who have already experienced the respective attraction (for instance a specific movie or theater show), to be presented for the consideration of other subscribers. Encounter program 165 is stored in a storage device as a set of instructions (i.e. software code) for the operation of encounter generator 110, and specifically for assigning encounters to subscribers in response to their wish-lists, in accordance to doctrine & rules 171. Doctrine & rules 171 is a set of computer algorithms and parameters that determine how the wish-lists of subscribers are transformed into the selection of ensembles and attractions, as will be described in more detail below. Doctrine & rules 171 are optionally customized by a leader via leader terminal 130, leader interface 177 and communication link 103. A guide database 182 includes viewable and/or printable files with guides for leaders and subscribers, providing guidelines, ideas and tips to make the encounters more effective. Such guides are preferably distributed, upon meeting specific predefined conditions, according to doctrine & rules 171 by processor 160 via leader terminal 130 or user terminals 120. A history log 180 is managed to log all system operations, so that encounters can be selected taking into account previous encounters. Interfaces 175, 177 and 179 include communication and protocol means to determine access rights and communication options to processor 160 from outside, as well as addresses, access rights and communication options for reaching outside servers and terminals from processor 160, and can be implemented using various hardware and software means, within one or several physical units.

It will be noted that attraction database 150 can include any combination of attractions 151 received, copied, or mirrored from commercial attraction provider servers 123 of attraction providers such as attraction operators and attraction agencies; promotional offers for the community members offered by attraction providers though attraction interface 179, and direct links to attractions servers 123 so that attractions can be reviewed and ranked by subscribers and selected by processor 160 even if their details are not physically recorded in attraction database 150. In an extreme case, attraction database 150 consists of just a collection of links to commercial attraction provider servers 123. In another extreme case, all the attraction information is entered directly into attraction database 150 by attraction providers through attraction provider terminals 123. Database 150 is very dynamic by nature since attraction offers are changed and refreshed perpetually.

It will be appreciated that the blocks described in FIGS. 1-2 are logical rather than physical entities, and can be implemented using a variety of suitable hardware, operating systems and database software, as well as distributed computing networks, known to persons skilled in the art, and even have a single block spread over more than a single computer; in particular, subscriber's record 141 may have the personal wish-list record 145 hosted on a different computer from the one hosting the other contents of the record, for functionality or privacy reasons. A specific case is where all or part of subscriber database 140 is hosted on a server of an existing membership organization, such as an Internet social networking or dating service, while the other blocks of encounter generator 110 are hosted on a server of another service provider. In another specific case of interest, encounter generator 110 can operate with subscriber database 140 and attraction database 150 whereby each of them is actually spread over one or more servers of membership organizations and attraction providers, respectively. In another case of interest, functionalities of encounter generator 110 can be performed by software applets running on personal terminals 124, provided that such terminals have the appropriate computation resources and online availability (which most desktop PCs may have). On the other extreme, the system of FIG. 1 can be compacted, even to the extreme case of an all-in-one configuration, wherein a single personal computer is used to implement the functionalities of encounter generator 110, leader terminal 130, and subscriber terminals 120 materialized as a public terminal 125. Also, a single physical server can host a plurality of encounter generators 110 serving a plurality of communities.

Figure 3:
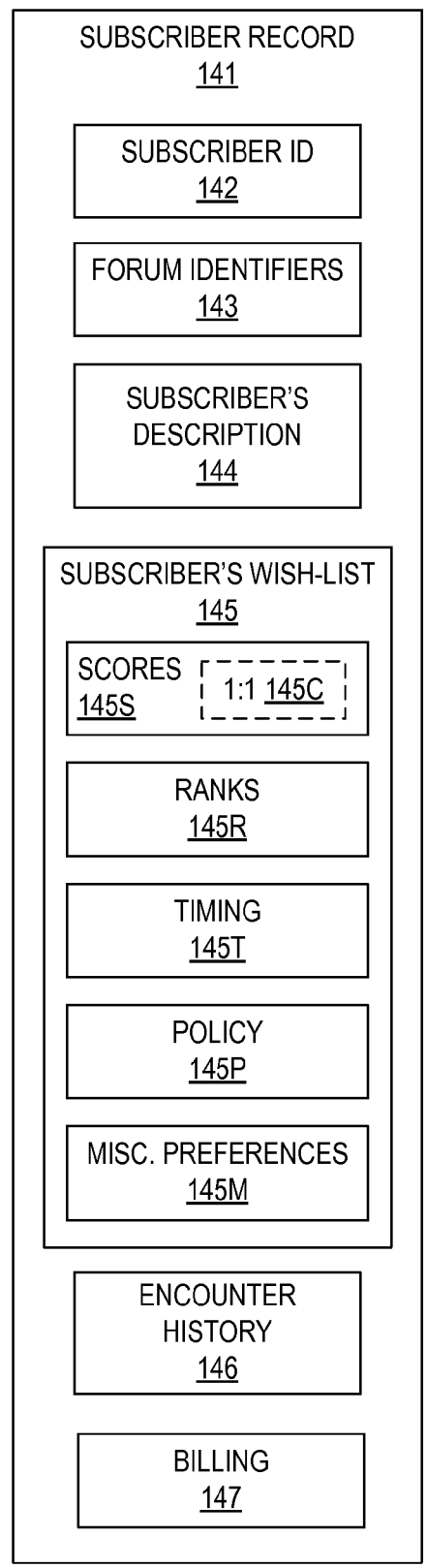
FIG. 3 is a simplified block diagram demonstrating the content of a subscriber record.

FIG. 3 schematically describes an exploded view of subscriber record 141 of FIG. 2. Field 142 includes a subscriber ID, typically a unique identification number that will distinguish each record from others in same database 140. Forum identifiers 143 indicate the forums to which the respective subscriber presently belongs; for instance, to a closed forum of friends and to a forum of ski fans. Subscriber's description 144 describes the subscriber personal details, such as name or names (in case that the subscriber is a couple or a family), ages(s), geographic and contact details, traits, and general interests. Wish-list 145 includes a dynamically-updatable selection of wishes: scores 145S define the level of interest of the present subscriber, i.e. the owner of subscriber record 141, in meeting other subscribers from the related forums. In specific cases, especially with friend seekers and mate seekers, optional subfield 'ready for one-on-one meeting' 145C allows a subscriber indicate that he or she feels comfortable with having a one-on-one encounter with the respective scored subscriber, otherwise they can be mutually assigned only to group meetings (of at least three participants). Subfield 145C can, in some implementations, be an explicit checkbox that the user selects or deselects with respect to each scored prospective partner; or, in other implementations, it can become part of score 145S; e.g. through a publicized system rule that "a score of '6' or more implies that you agree to a one-on-one meeting with the scored partner". Ranks 145R define the level of interest of the present subscriber in specific attractions from attraction database 150. Timing 145T defines the desired schedules for having meetings. Policy 145P specifies how often the subscriber wishes to participate in encounters, as well as the subscriber's instant priority among the selection of partners (i.e. scores), attractions (i.e. ranks) or schedule (i.e. timing). Miscellaneous preferences 145M includes additional information with respect to the desired attractions, such as adding the name of a specific movie if the attraction is specified just as 'movie' in attraction database 150. Encounter history 146 records the encounters assigned to the instant subscriber by encounter generator 110, for the cases (especially with mate seekers and friend seekers) that the encounter generator is programmed to systematically acquaint participants to each other. Billing 147 includes details of financial transactions between the subscriber and the community organizer, where appropriate. It will be noted that scores 145S, ranks 145R and timing 145T can be specified in interdependent manner; for example: one may rank theater high with respect to one partner and low with respect to another partner; one may time a restaurant to a lunch break while café will be timed to the evening, etc., as demonstrated in FIG. 4E below.

FIGS. 4A-E provide an exemplary exploded view on variants of wish-list 145 of FIGS. 2 and 3. The tables demonstrate both a user interface for entering the wish-list, as well as the content of the respective subscriber's wish-list record 145 of FIG. 2. The present examples relate to a forum of eight entertainment seekers and to the wish-list of an exemplary "Mary" who is one of the forum members. FIG. 4A describes an exemplary policy 145P, wherein Mary has indicated that presently she wants to go out for a few hours three times this week, as well as twice for a weekend break in the coming two months and have one long journey this year; she has also determined that presently her first priority is the attraction she wants to visit, her second priority is with whom she wants to visit that attraction, while she is relatively tolerant with respect to when she wants to go out within her timing specifications 145T (see FIG. 4C).

FIG. 4B shows exemplary scores 145S of Mary with respect to the other forum members. Thus, Mary clearly prefers the company of Peter or Rachel on that of Jim or Suzy. This affects the probability of encounter generator 110 arranging a meeting with the specified prospect, taking into account also the reciprocal score for Mary by each relevant subscriber.

FIG. 4C demonstrates an exemplary of timing 145T of the present subscriber, with respect to going out during the next seven days, where the relative priorities are represented by points in the range 1-9; thus the present subscriber can go out on Tuesday or Thursday for lunch, but highly prefers to go out Sunday afternoon or on the evening of Friday or Saturday; possible times for a weekend break within the coming two months and long trips within this year are indicated by their dates and relative priority in parentheses.

FIG. 4D demonstrates an exemplary set of ranks 145R and miscellaneous preferences 145M entered by the present subscriber, Mary, within her wish-list 145, with respect to attractions 145A. She would agree to go to a movie that is a comedy, within a company of 2-4 persons, provided that tickets have promotional pricing. However, she would highly prefer to see the movie "Harry Potter" accompanied by one partner. She'll agree to go out for a Saturday in the country, but would highly prefer Saturday-Sunday in the mountains.

FIG. 4E demonstrates an exemplary consolidated wish-list in an interdependent format, which is an alternative to FIGS. 4B-D. Thus, our present subscriber Mary agrees to go to a promotional comedy in a company of 2-4 persons, provided that Suzy is not included (rank='0'); the same event will be of high priority (rank='9') if John is included in the company; other partners are ranked by default '4'. Andy's café is her favorite (default rank='9') for Friday evening, but only if she goes there with one of the men in the forum (going there with a woman is ranked '0').

It will be noted that in many cases, especially with entertainment seekers, an encounter generated by the present invention can be presented as a suggestion, and the parties are free to update and tweak the particulars through a conventional dialog beyond the scope of the present invention. Just, for example, if encounter generator 110 has picked the present subscriber (Mary) and John for visiting a movie theater on Friday for a comedy, they will need to negotiate which comedy they both have not seen and would like to visit, and if they don't find one, they may decide to visit a café instead. As a general rule, the more specific the wish-list of a subscriber, the lower is the probability that encounter generator 110 finds an encounter that matches all of his, her or their requirements. A subscriber whose wish-list expresses the willingness to go out to any event, at any time and with any combination of friends from the forum, will be picked by encounter generator for many more encounters than another subscriber whose wish-list determines that he wants to go out only to a specific movie, only with Rachel and only on a Friday at 9:00 p.m. In other situations, for example in a forum of mate seekers, high attraction specificity and high subscriber compliance with the specifics of the encounters generated by encounter generator 110 may be required according to the forum rules in order to accomplish the forum goals.

FIGS. 4A-E present exemplary contents of wish-lists 145, in a format that also resembles input screens for entering or updating the respective data. Many variations of data entry screens are known in the art of GUI (graphic user interface) design to ease entry of data, such as fill-in tables, checkboxes, pull-down menus, context-sensitive (right-click) selections and so forth, which extend from the focus of the present invention. However, a point that deserves special attention is what data is available to a subscriber when entering or updating the wish-list. A specific case of interest is highlighting specific items in the attraction database 150, for example by color-coding, to identify special cases such as: attractions that have been already selected by other forum members; attractions that have been recommended/criticized by subscribers in field 151F of attraction database 150 (FIG. 1); and attractions which are offered under promotional terms by the attraction providers from commercial attraction provider servers 123. Another data presentation option relates to partial disclosure of the subscribers' wish-lists; while the scores granted to other subscribers are inherently confidential, the ranks of various attractions may be presented to other subscribers, especially in cases of attractions entered into attraction database 150 by the initiative of subscribers. The publication of such attractions, and possibly the preferred schedules, can form an electronic billboard for the forum members, identifying and highlighting a specific attractions as associated with a specific subscriber and timing, such as "Suzy is interested in visiting the movie 'Harry Potter' on Tuesday afternoon"—which may drive other subscribers to notice same attraction and timing to affect their own wish-lists.

Figure 5:
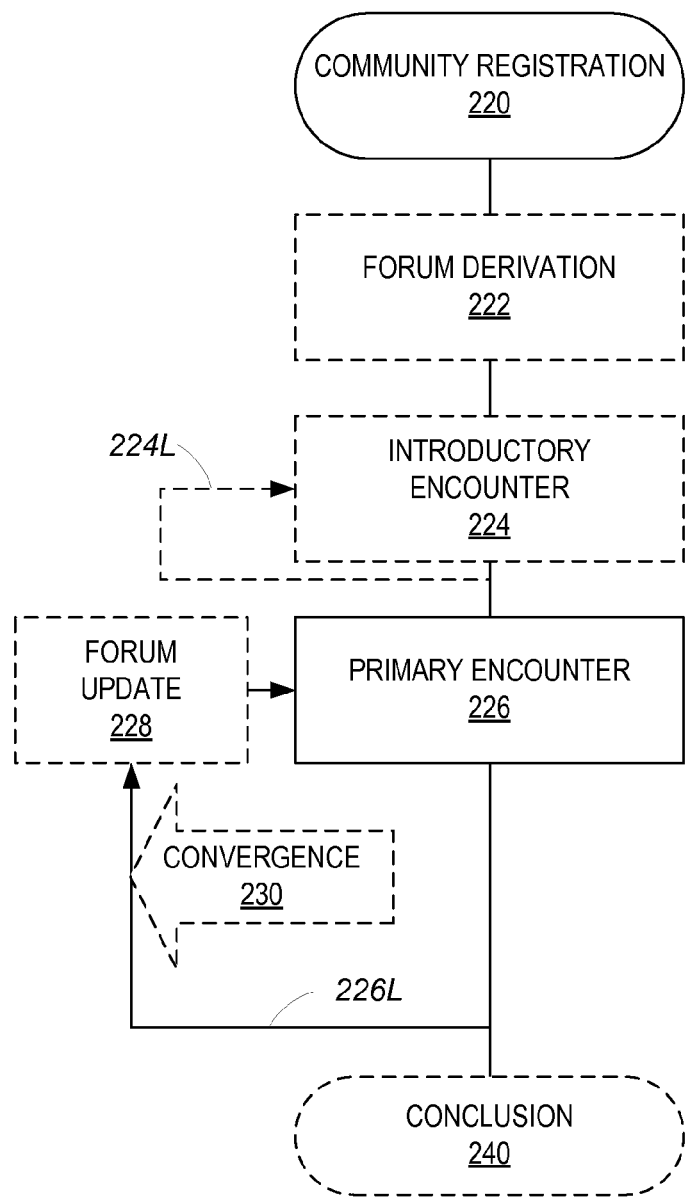
FIG. 5 is a simplified flowchart describing the operation of a preferred embodiment of the present invention.

FIG. 5 provides a schematic generalized overview of the operation of preferred embodiments of the present invention customized for various audiences. The descriptions below refer also to FIGS. 1 and 2. Blocks having a dashed frame represent steps that are optional in all or specific embodiments. Operation commences in a step 220 by a community formed by member registration into subscriber database 140 (or an already exiting community joining the service of the present invention). The community membership can be updated anytime afterward (not shown). Registration is preferably made electronically, using a subscriber terminal 120. During registration, the personal details are entered into subscriber's record 141. In a step 222 a forum of subscribers is optionally derived from the community members. The forum selection affects subscriber database 140 by including the forum identifier 143 within the subscriber's records 141 of the respective subscribers. In a step 224 the forum members are optionally introduced to each other through a prescribed set of one or more encounters (as represented symbolically by optional loop 224L) that is generated by encounter generator 110. In a step 226, a series of primary encounters (the plurality represented symbolically by loop 226L) is generated within the forum in response to the wish-lists 145. The forum membership may be updated between encounters in optional step 228 to reflect subscribers added to or leaving the forum. In case of entertainment seekers, step 226 with optional updates from step 228 may last indefinitely, upon the decision of the forum members. However, in case of mate seekers or friend seekers, the encounters will start to converge in step 230 to either more encounters between subscribers who have developed an affection for each other, or to subscribers failing to develop mutual interest with others; this will lead, after reaching a predefined level of mutual interest, or a predefined number of encounters, or upon the stabilization of the scores within the forum's wish-lists, to the conclusion in step 240 of either having found the desired mate or friends (and then maybe offering registration to a forum of entertainment seekers), or failing with the present forum, and then either joining another forum or trying another method.

Figure 6:
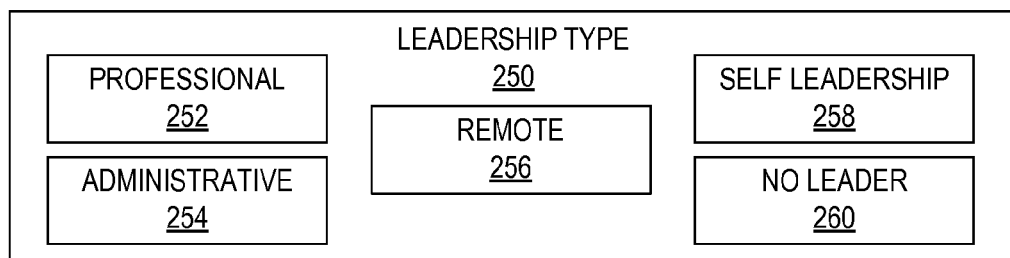
FIG. 6 is a simplified block diagram summarizing leadership types in various preferred embodiments of the present invention.

FIG. 6 symbolically lists five levels 250 for involving a human leader in community and forum operations. A "leader" herein denotes an individual or a team that is involved in facilitating community or forum activities and has access to leader terminal 130 of FIG. 1 for predefined operations. Professional leader 252 is a professional, such as a psychologist or group moderator, who physically participates in at least some group encounters; such a professional may have extended rights to monitor and intervene in the operation of the system through leader terminal 130. Administrative leader 254 participates in group encounters for coordination and services, and has limited access to the system through leader terminal 130, such as for getting requirements from the system (e.g. providing accessories for a social game) or vetoing some attractions that have become irrelevant because of external attraction cancellations or harsh weather conditions. Remote leader 246 is a professional or administrative leader that operates similarly to leaders 252 or 254, but does not physically attend an event; in this case, subscribers preferably communicate with the leader either through their terminals 120, or through any other electronic communication system. Self leadership 258 is when a forum is led by an individual or a team from the forum; such leadership can be established either by an individual subscriber who have actually initiated and established the forum (e.g. an initiator of a high school class reunion), or is elected by the forum members. No leader 260 is the case where the nature of the encounters does not require a human leader; for example in a forum of friends seeking entertainment in movies, restaurants and theater shows. It will be noted that the present discussion on leadership relates to the operation of system 100 of the present invention, primarily through terminal 130, toward arranging encounters; once an encounter has been arranged by the system of the present invention, further leadership within the encounter (e.g. by a ski guide, a tour guide or in a guided concert) are beyond the scope of the present invention.

Detailed Description of the Operation

The following sections will describe in more detail the steps of FIG. 5. At each step, the discussion will highlight the differences between the audiences of mate seekers, friend seekers and entertainment seekers.

Deriving a Forum

Forum derivation relates to step 222 of the general operation procedure of FIG. 5. A community is optionally divided into forums, to ease the scoring procedure by subscribers, to retain the privacy of subscribers, to make the interaction more focused and motivated (for mate and friend seekers) and to make the technical operation of encounter generator 110 more efficient. It will be appreciated, however, that forum derivation is not mandatory for the operation of the present invention, and has little advantage in communities that are both homogenous and relatively small, such as the students of a certain college; thus, defining a forum which spans the entire community is perfectly acceptable.

Figure 7:
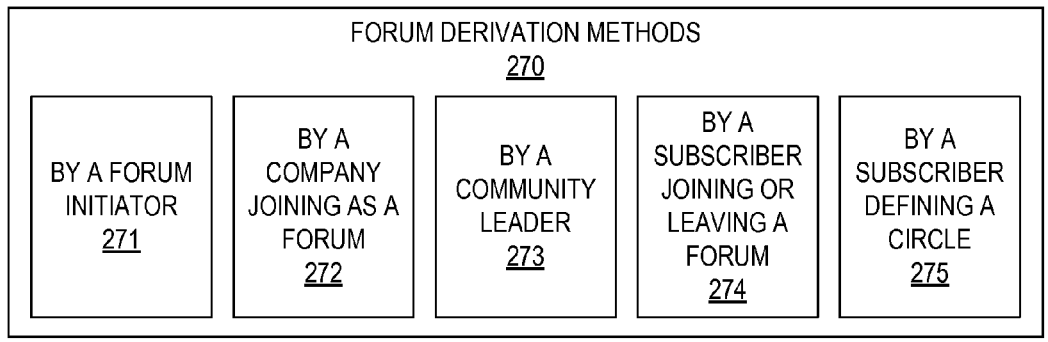
FIG. 7 is a simplified block diagram summarizing forum derivation methods in various preferred embodiments of the present invention.

FIG. 7 provides a list 270 of various exemplary methods for forum derivation. Method 271 relates to a forum established by a subscriber or a forum leader, who initiates a new forum of, say, skiing enthusiasts aged 30-40 living in Denver, Colo. Method 272 relates to a company, such as a group of friends or the members of a certain school, who join a larger community as a closed forum. It will be noted that for a closed forum, the community serves just as a functional framework for sharing the technical resources of the present invention, and has no social role. Method 273 relates to the case where a community leader derives a forum (including, possibly, a circle for each subscriber) from the community members; this is a preferred method for mate seekers and friend seekers, since the process of identifying and developing relationships with a prospective mate or friend is preferably made through repeated encounters within a relatively-compact forum of compatible subscribers; to assist his or her commonsense, the community leader can sort subscribers by rough criteria of geographic location, age, education level and balance between the numbers of men and women, or by more sophisticated personality-matching criteria and computerized aids known in the art. Also, if the community members have already participated in a previous mate-seeking or friends-seeking forum, encounter generator can optionally identify from the previous wish-lists 145 subscribers who have already developed a predefined level of mutual liking, and recommend their joint inclusion within a common forum for the next encounter series. A community leader can also select to establish for each subscriber a circle of subscribers that are mutually-compatible with that subscriber. As explained above, such circles may often not coincide because compatibility criteria are often not transitive (e.g. age 30 may be found compatible with age 25 and age 35, but ages 25 and 35 may be found incompatible). Method 274 of FIG. 7 relates to updates to an existing forum by new members joining or existing members leaving. For example, a forum of skiing enthusiasts which invites new members by the initiative of its current members, forum leader or community leader, or an existing member leaving upon relocating to another state. Method 275 relates to the case where an entertainment seeking subscriber defines a circle that includes himself and a number of selected friends, and asks to have mutual access through the system to only the members of this circle. Since friendship is not transitive, i.e. a friend-of-a-friend is not necessarily a friend, circles will often not coincide.

Figure 8:
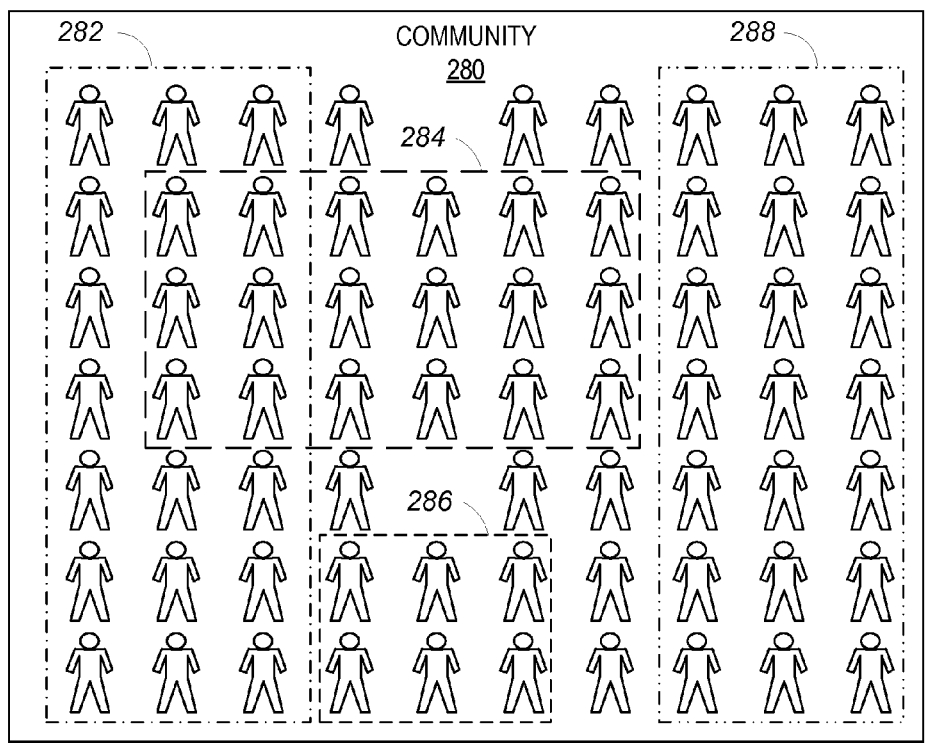
FIG. 8 is an illustration of an exemplary division of a community to forums.

FIG. 8 schematically describes an exemplary division of a diversified community 280 into forums. The silhouettes shown in FIG. 8 represent a variety of subscribers that can be individuals, couples or families. It will be noted that an individual may be part of more than one subscriber (e.g. as himself/herself, as part of a couple and as part of a family), and can belong to more than one forum. Forum derivation is made, for example, by the community leader through leader terminal 130 (FIG. 1), according to the characteristics and requests of the subscribers, as explained above. In the present example, forum 282 is made up of families interested in skiing, while forum 284 is of families interested in family-oriented classical music concerts; it would be noted that some subscribers belong to both forums 282 and 284. Forum 286 is composed of a group of couples who are already a company of friends, and prefer to arrange encounters only within their company. Forum 288 is a group of compatible singles, selected by a community leader to participate in a series of encounters.

Figure 8A:
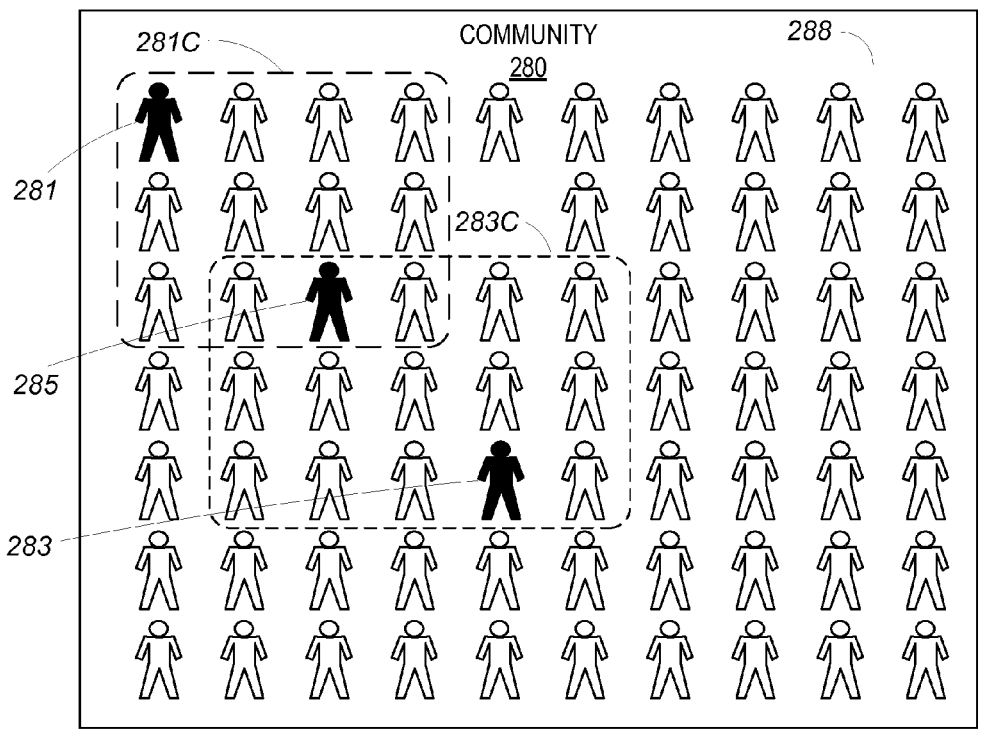
FIG. 8A is an illustration of an exemplary division of a community to circles.

FIG. 8A is a schematic illustration that reemphasizes the circle concept. Member 281 belongs to community 280, and frame 281C encompasses the circle of member 281, i.e. member 281 and the other community members that are assignable to an encounter with member 281. Similarly, frame 283C encompasses member 283 and the member's circle. It would be noted, however, that while member 285 can be assigned for an encounter with both member 281 and member 283, the latter two cannot be assigned to a mutual encounter because they do not belong to the same circle. In one example, this is because while member 285 is a friend of both member 281 and member 283 and both have elected him/her for their respective circles, members 281 and member 283 are not friends of each other. In another example, the leader of community 280 has established circle 281 as those members who are not more that 5 years of age apart from member 281 (who is 25 years old) and therefore included member 285 (30 years old) in that circle. Similarly, member 285 is included in the circle of member 283 (35 years old). However, members 281 and 283 are not included in the same circle since they are 10 years apart. A similar situation may arise when a circle is derived by geographical vicinity or other proximity criteria.

Introductory Encounters

One or more introductory encounters (step 224 of FIG. 5) are optional, for acquainting forum members with each other toward primary encounters 226. Typically, forum introduction is needed for acquainting friend seekers and mate seekers who are originally unacquainted with each other, and this step can be skipped in case of a new forum of entertainment seekers established by or for people who already know each other. The main practical function of the forum introduction is providing an initial basis for mutual scoring within the respective wish-lists. Thus, mate seekers need to get introduced only with the forum members of their selected gender, and friend seekers may want to be introduced to everybody in their forum.

Figure 9:
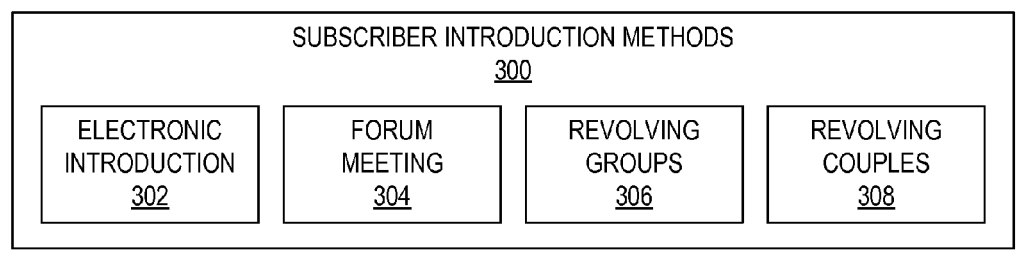
FIG. 9 is a simplified block diagram summarizing subscriber introduction methods in various preferred embodiments of the present invention.

FIG. 9 graphically presents a list 300 of introduction methods for introductory encounters 124 (FIG. 5). These methods can be used individually or in combination in order to reach a desired level of initial acquaintance, by the option of the forum members or the forum or community leader. The forum introduction can be arranged manually, by the forum members or the forum or community leader, externally to the operation of encounter generator 110, or can be arranged by encounter generator 110, as described below.

Electronic introduction 302 by encounter generator 110 uses electronic communication, such as a web browser, email, Internet chat, video teleconference or telephone conversation, to let the forum members get information and interact with each other on one-on-one and/or group settings. Such interactions are arranged according to the methodologies described below with respect to face-to-face introductions 304, 306 and 308. Even if electronic introduction 302 is used, it is preferably followed by face-to-face introductory encounters to complete the introduction. Forum meetings 304 are arranged by encounter generator 110 calling the forum members to meet and get introduced to each other in an attraction such as a short journey, or a short guided group workshop. Revolving groups 306 is a systematic series of face-to-face group meetings called by encounter generator 110 to ensure that everyone meets every relevant other from the forum, through a series group meetings of, say, 3-8 members in each meeting. Revolving couples 308 is a series of face-to-face couple meetings (e.g. visiting a movie followed by a café) called by encounter generator 110 to ensure that everyone meets every relevant other from the forum on a one-on-one basis.

The introductory encounters 224 are different from the primary encounters 226 of FIG. 5, in that the participants are preselected for each meeting to ensure systematic introduction, thus ignoring mutual scoring, if such has already been entered by the participants; and the offered attractions are adapted to be long and interactive enough to allow reasonable acquaintance while being short and neutral enough to avoid awkward experiences with unwanted strangers. Comparing the three face-to-face introduction methods 304, 306 and 308, forum meeting 304 is the hardest to organize since it requires a meeting place and a meeting guide; it is very efficient since it is completed in one session; but it is the least effective since acquaintance experiences are random and may be superficial and confused with each other; revolving couples 308 is the easiest to organize and coordinate, is very effective in getting a mutual impression, is very inefficient since many meetings are needed in order to complete the forum introduction, and may be stressful for many who feel uncomfortable in a one-on-one meeting with a complete stranger; revolving groups 306 seems to offer a fair compromise between a forum meeting and revolving couple with respect to ease of organization, effectiveness, efficiency and enjoyment. Thus the choice of a method or combination of methods is the option of the forum members or the forum or community leader, according to the circumstances of the forum and the preferences of its members.

While introductory encounters are insensitive to the mutual scoring of the forum members, they are preferably still responsive to the other wish-list elements, such as attraction ranking, timing and miscellaneous preferences.

Principal Encounters

Principal encounters 226 (FIG. 5) are the heart of the present invention. In a forum of entertainment seekers, encounters allow the forum members to enjoy the company of each other while visiting a variety of attractions, and thus the loop 226L (FIG. 5) can be open-ended, with some forum updates 228 happening when new members join the forum or current members leave it. In a forum of mate seekers or friend seekers, the process involves not only enjoyable encounters, but also seeking opportunities for meeting a mate or making new friends. Accordingly, such encounters within a specific forum are organized for a predetermined time or number of encounters or until the mutual scoring within the participants' wish-lists stabilizes, hence the elements of convergence 230 (FIG. 5) and conclusion 240. Convergence 230 is based on a behavioral pattern expected to be recognized by encounter generator 110 in the mutual scores inputted by the subscribers, identifying those who have found each other within the forum and those who could not find a mate or create new friendships on a mutual basis within the current forum, and it affects the operation of encounter generator 110 by assigning more intensive and demanding encounters to subscribers who have reached a higher level of acquaintance and/or mutual interest, as measured by their mutual scores as well as by the number of times they have met (see co-pending U.S. application Ser. No. 10/841,268 to the present inventor.) Upon conclusion, some participants have reached their goal, and may move to another forum of entertainment seekers along with their new mate or friends, while some others who did not reach their goal may wish to participate in another session of encounters within a newly-formed forum for having another chance with other prospects. Since encounter generator 110 knows the mutual scores of all forum members from their wish-lists 145, it preferably, upon the conclusion of the current forum, reports to the community leader on community members who have reached a predefined level of mutual interest, so that the leader can put them together in a next forum derived according to step 222.

Arranging Principal Encounters

This section describes in detail the process of arranging principal encounters by encounter generator 110 of FIGS. 1-2, represented by step 226 of FIG. 5.

An encounter is composed of an ensemble, schedule, and an attraction (that may be an appended attraction, e.g. a visit to a movie followed by a visit to a café). In the case of mate or friend seekers, some or all encounters may involve a schedule dictated by a forum leader, leaving primarily the ensemble and attraction selection to be affected by the members' wish-lists. In the case of entertainment seekers, there is often no forum leader at all, and members frequently update their wish-list (i.e. policy, scores, ranks, timing and miscellaneous preferences—see FIGS. 4A-E) according to changing attraction offers, personal circumstances, and mood; attraction database 150 is also very dynamic, since it continually receives updates from both subscribers and attraction providers (from commercial attraction provider servers 123 of FIG.

1) under regular or promotional terms. Thus, the most demanding operation of encounter generator is for the case of entertainment seekers, and the following discussion will cover this case in details. For a discussion focused on a configuration of encounter generator 110 for mate seekers or friend-seekers, see also co-pending U.S. application Ser. No. 10/841,268 to the present inventor, incorporated herein by reference as if set forth herein. The following discussion focuses on entertainment-seeking subscribers.

With reference to FIGS. 1-2, an encounter is generated by encounter generator 110 by picking several subscribers to compose an ensemble, and assigning to them an attraction and schedule; alternatively, a schedule may be first selected, followed by adding subscribers and attractions, or an attraction can be selected first, followed by adding subscribers and schedules. The operation of encounter generator 110 is guided by the wish-lists 145 of the forum members, and by the content of attraction database 150, possibly including links to commercial attraction provider servers 123 of attraction providers. Sometimes encounter generator 110 identifies subscribers with high mutual score and either matching attractions or matching schedules, but not both. In this case, encounter generator 110 may preferably "suggest" an encounter for the respective partners by sending them a message such as 'to Jim: John and you have expressed high interest in going out tomorrow evening, but you prefer a theater show and John prefers a movie; maybe you want to talk to each other to find a mutual choice', or, in the other case: 'to Jim: John and you have expressed high interest in visiting a movie, but you prefer Tuesday and John prefers Wednesday; maybe you want to talk to each other to find a mutual time.'

In its operation, encounter generator 110 needs to check, match and resolve conflicting wishes. While conflicting wishes with respect to attraction specifics and timing can be resolved by suggesting calling each other as described above, conflicting wishes with respect to partner scores are much more sensitive, which makes wish-list 145 preferably secret. Thus, the fact that John prefers the company of Jim on that of Paul will usually be kept secret from anyone except John and encounter generator 110. Now, if John prefers the company of Jim, but Jim prefers the company of Paul, while Paul has equal liking to both John and Jim, there is a conflict that needs to be fairly resolved. Sometimes it is resolved naturally through the attraction preference, while in other cases random number generator 160R is preferably called to draw the choice.

With a large number of factors and variables, it is hard or even impossible to define a 'perfect strategy' that will make every subscriber happy; however, a 'good enough' policy may be satisfactory in most cases, since, in any case, the encounters involve desirable attractions with desirable partners, and the preferable inclusion of a random factor adds variety, reduces the complexity of the design and execution of encounter generator 110, and ensures fairness.

Doctrine and rules 171 of FIG. 2 determine how encounter program 165 runs on processor 160 to generate encounters. The following will represent an exemplary preferred variation of doctrine and rules 171.

Figure 10:
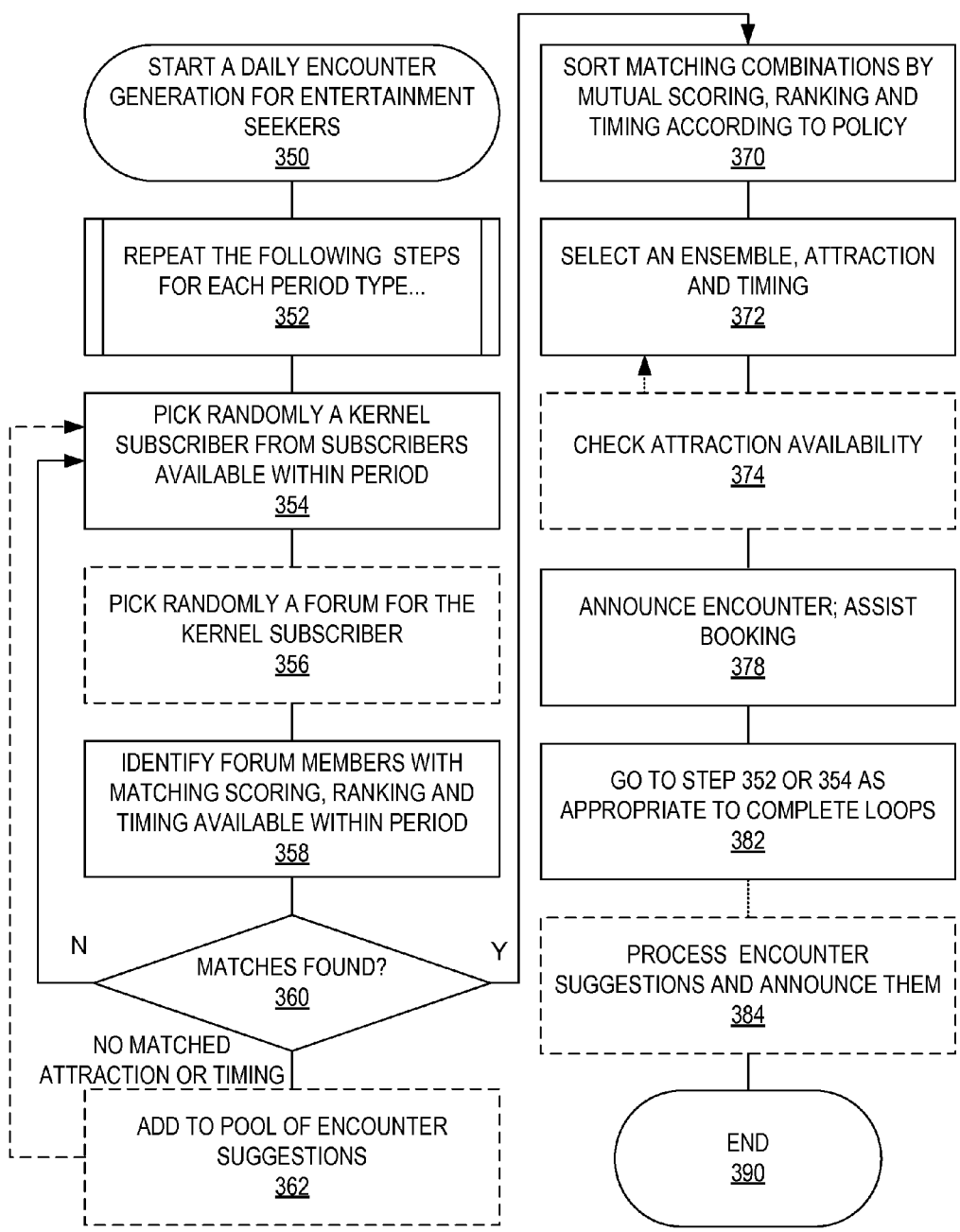
FIG. 10 is a simplified flowchart of the operation of a preferred embodiment of the present invention.

Reference is made to FIG. 10, which describes a preferred exemplary mode of operation of system 100 of FIG. 1 for a community of entertainment seekers (embodiments focused on organized events for mate seekers and friend seekers are covered in detail in co-pending U.S. application Ser. No. 10/841,268 to the present inventor and are incorporated as if set forth herein). Blocks with dashed frames represent optional steps that are dependent on specific implementations. The present exemplary doctrine assumes that encounters for entertainment seekers can be generated and updated with a resolution of once a day, so the process start at a step 350 by activating encounter generator 110 (FIGS. 1-2) at, say, 6:00 a.m. daily to generate encounters for entertainment seekers.

A step 352 represents schematically that the next steps will be repeated for each period type; this will be best defined and understood with respect also to FIG. 4C. Short encounters, such as a movie or a café, are preferably generated for the next seven days; weekend breaks are preferably generated for the next two months; and long journeys, such as a trip abroad, are preferably generated for the next year. The next steps will be described for the case of generating short encounters for the next week; similar steps will be repeated through step 352 for generating weekend breaks and long journeys for the next two months and a year, respectively.

A step 354 identifies community subscribers (that can be individuals, couples or families, according to the instant community) who are available for the period under discussion, which is the next seven days in the present example, and then employs random number generator 160R for randomly picking one of them, that will be referred-to as a 'kernel subscriber'. Subscriber availability is preferably determined by four factors: (a) by the subscribers' policy 145P (FIGS. 3-4A) that defines how may times a week the subscriber wishes to go out; (b) by the past fulfillment of those wishes through previous runs of encounter generator 110 as derived from history log 180 (FIG. 2) or encounter history record 146 (FIG. 3); (c) the timing preferences 145T (FIGS. 3 and 4C); and (d) if same person appears within more type of a subscriber (e.g. a couple and an individual), then a previous assignment by encounter generator 110 as one entity (e.g. a couple assigned for a movie) may preclude going out as an individual subscriber on the same day. Thus, if the policy 145P of a prospective subscriber indicates going out once a week, and the subscriber has already been selected for a movie tomorrow in a previous run of encounter generator 110, and the date a week from now is excluded in the subscribers' timing preferences 145T, then this subscriber is considered unavailable in step 354. Thus, step 354 ends up with a subscriber that is available for an encounter within the next seven days. If no available subscriber is identified in step 354, then encounter generator 110 will attempt to move back to step 352 for the next period type (e.g. weekend breaks within the next two months), or to steps 384 and 390 to conclude the daily procedure (connecting lines and decision blocks for this case are omitted from the flowchart of FIG. 10 for brevity and clarity).

A step 356 is optional, for the case that the subscriber is a member of more than one forum (see forums 282 and 284 of FIG. 8.) In such a case, one of the forums is selected (in alternative embodiments, the subscriber may prioritize the forums, and the selection will be made according to such priorities). The forum can be any of the forum types of FIG. 7, including a circle 275 of the kernel subscriber. Step 356 is obviated if the subscriber belongs to only one forum. In any case, entry into step 358 is done after a specific forum has been identified for the kernel subscriber. In some cases discussed above, the forum may encompass the entire community.

A step 358 scans all the members of the present forum to identify those that are still available (see the availability criteria discussed with respect to step 354) and can be matched based on mutual scoring, ranking and timing. Members that cannot be perfectly matched with the kernel subscriber are: (a) those who have excluded the kernel subscriber or have been excluded by the kernel subscriber through a '0' score 145S in the respective wish-lists 145; (b) those who have no common attraction of interest, as derived from the respective attraction rankings 145R; and (c) those who have no overlapping schedule with the kernel subscriber, as derived from the respective timings 145T.

A step 360 categorizes the findings of step 358 into three cases: if no other subscriber can be matched with the present subscriber, then the present subscriber is flagged as unavailable for step 354 for the current daily run (or unavailable for the current forum selected in step 356 if the subscriber is a member of more than one forum), and the procedure will jump back to step 354. If only partial matches have been found, i.e. either the attraction specifics or the timing could not be matched, then in a step 362 the subscriber will be registered in a temporary pool of possible attraction suggestions, as will be described in more detail below with respect to step 384. In the successful case of identifying potential matches in step 360, the procedure will move to step 370 for actual matching.

In a step 370, all matching combinations of partners, attractions and timings with respect to the current kernel subscriber are generated and then sorted by mutual scoring, by mutual ranking of the same attractions, and by timing. The sorting priority is determined by the policy 145P of the kernel subscriber (see FIGS. 3 and 4A) that forms part of the respective wish-list 145. Thus, if the subscriber's current main interest is finding partners for visiting a specific attraction (see the example of FIG. 4A), then the attraction matching (i.e. mutual attraction ranking) will have first priority while the specific partners (i.e. mutual scoring) will have a second priority and the timing will be the third. In another case, when one wishes to go out with specific friends and cares less about attraction and timing, the kernel subscriber's policy 145P expresses these priorities accordingly and result in sorting by mutual scoring before sorting by attraction ranking or timing. If two combinations deserve an identical placement in the sorted list, their actual order is preferably determined randomly.

In a step 372, an ensemble (i.e. the subscriber and one or more partners), an attraction and a timing are selected from the combination that appears first in the sorted list. For brevity, the present preferred embodiment is described with respect to ensembles of two subscribers. In an optional step 374, the respective attraction server that is related to the selected attraction is contacted to confirm attraction availability. If the requested attraction and/or timing are found unavailable in step 374, then the process jumps back to step 372 that moves to the next combination in the list generated in step 370. The loop of steps 372-374 continues until the ensemble, attraction and timing in a selected combination are confirmed in step 374, or until the entire combination list from step 370 is exhausted, which leads to a failure, resulting similarly to 'no' in block 360.

Following the sequence of steps 372-374, an encounter composed of an ensemble, attraction and timing has been generated, and is announced in a step 378 to the ensemble members, and, according to the system's doctrine and rules 171 (FIG. 2), possibly also presenting an electronic commerce screen, possibly linked directly to the respective commercial attraction server 123 (FIG. 1), for booking (i.e. reservation and/or ticketing), where appropriate, which completes the successful encounter arrangement for that ensemble members. In a step 382, the process loops back to step 354 for arranging the next encounter within the same period type, or, if all possible encounters for the present period have been completed, then the loop moves to step 352 for starting with the next period type (i.e. moving to arranging weekend breaks for the next two months.) If all possible encounters in all period types have been completed, then the procedure moves to an optional step 384, to look into the pool of partly-matched members created in optional step 362. This pool included subscriber pairs who have matching scores (i.e. have mutual interest to meet) as well as either matching schedules or matching attractions but not both. However, since the system has had many iterations trough steps 358 and 360, some of those who were entered into the pool in step 362 have been removed since they found a complete match, while some others may participate in more than two possible partial matches. Encounter generator 110 then identifies the remaining partial matches, prioritizes them according to the mutual scoring of the members, and generates suggestions and sends them to the respective subscribers, who are offered to call each other in order to resolve conflicts with respect to attraction or schedule. The process ends at step 390, readying encounter generator 110 for receiving updates from subscribers, forum and community leaders, and attraction providers, toward another encounter generation on the next day.

It would be noted that the doctrine described above with respect to FIG. 10 is centered on selecting randomly a kernel subscriber and checking matched combination with respect to that subscriber. Accordingly, that subscriber's wish-list, and especially the subscriber's policy, gets advantage over the wish-lists of other subscribers who are matched with the kernel subscriber. However, the combinations sorted in step 370 take into account mutual scoring, mutual timing and mutual ranking, and also, the very fact that the kernel subscriber is selected randomly offers fairness because the next time other subscribers will be picked as kernel subscribers in step 354.

The random selection described above offers a fair and efficient doctrine for running encounter generator 110, but not the only possible doctrine. Alternative doctrines that match different tastes and offer a variety of tradeoffs between responsiveness to the wish-lists (under various models for measuring such responsiveness) and the complexity of the operation of encounter generator 110 can be devised by those skilled in the art.

Mutual Scoring, Ranking and Timing

The doctrine described with respect to FIG. 10 above, takes into account the mutual interests of the members of a forum for selecting an ensemble, attraction and schedule. FIGS. 11A-14B demonstrate how such mutual interests are calculated. For clarity and brevity, an exemplary simplified case is described, with respect to an eight-member entertainment-seeking forum, four attractions and seven schedule options. The description will focus on the viewpoint of a specific kernel subscriber, "Mary". It will be appreciated that the principles described below can be seamlessly extended into larger forums, many attraction offers and a variety of schedule selections.

FIGS. 11A-B describe and exemplary embodiment for calculating mutual scoring from wish-lists 145 of FIGS. 1-2. FIG. 11A describes the scoring of the forum members (upper row) by the forum members (leftmost column). The scoring scheme used in the present exemplary embodiment is in the scale of 0-9, wherein '0' means that a specific forum member is unwanted by the respective forum member, and the other score values reflect an intuitive relative preference; thus, Rachel excludes Mary while John excludes Peter. At least this part of the wish-list is preferably kept confidential, since the subscribers want their true social preferences to affect the encounters generated by the system, but would often prefer not to openly divulge their true personal feelings to others.

FIG. 11B relates to Mary as a kernel subscriber selected in step 354 of FIG. 10. The 'to' row describes Mary's interests in other subscribers (copied from the table of FIG. 11A), while the 'from' row describe the interest of the other forum subscribers in Mary (from Mary's column in the same table of FIG. 11A). Thus, although Mary likes Rachel very much ('8' score), Rachel dislikes Mary ('0'). The 'mutual' row calculates the mutual liking between Mary and each of the other forum members. The formula presented in table 11B is based on zeroing the mutual liking if anyone dislikes Mary or is disliked by Mary, while all other mutual liking are based on adding up the mutual scores. It will be appreciated that many other approaches to weigh-in the mutual scoring in order to derive a mutual liking are possible, for example by multiplying the individual scores or by calculating the root-mean-square of non-zero scores, etc. While often the formulas will give an equal weight to the scores of all participants, asymmetric weighing is also possible in some embodiments, for example for giving higher weight to the wishes of women in a singles' implementation, or to the one who has a birthday this week. The effective formulas are determined by doctrine & rules 171 (FIG. 2) and can be updated from time to time, for example by the forum or community leader or by a system administrator. Encounter generator 110 (FIGS. 1-2) derives table 11B from table 11A and then can prioritize prospective partners for Mary by the descending order of John, Peter/Paul, Jim, Suzy and Anna (Rachel being excluded), as can be easily derived from sorting the 'mutual' row of the table of FIG. 11B.

FIGS. 12A-B relate to timing preferences, within a simplified exemplary time slots of seven weekdays (a finer timing resolution is shown in FIG. 4C). FIG. 12 describes the relative timing preferences of the forum members, wherein '0' excludes a time slot while '9' shows the highest preference. FIG. 12B matches the timing preferences of Mary, our current kernel subscriber, with the other forum members, by a simplified method of adding-up the non-zero timings. As can bee seen, Mary wishes to go out only on Tuesday, Friday or Saturday, with a possible meeting with Paul only on Saturday, while preferably meeting with Rachel or Suzy on Friday; other possibilities are easily visible as well.

FIGS. 13A-B relate to attraction ranking, within a simplified exemplary attraction database 150 (FIG. 2) of four attractions. FIG. 13A describes the forum member's interests (again, in the scale 0-9 where '0' shows disinterest) in the attractions, while FIG. 13B shows the mutual interest of our exemplary kernel subscriber, Mary, and each of the other forum members, in each attraction. Thus, for example, the highest mutual attraction ranking is visiting Andy's café with Jim or Rachel, while Paul can be a companion only for the movie "Fantasia" or Andy's café.

It will be noted that both FIG. 12B and FIG. 13B employ a specific simplified formula (similar to that of FIG. 11B) to calculate mutual interest from individual interests, and many other formulas can be employed as well, as determined by doctrine & rules 171 of FIG. 2. It will be also noted that the interdependent scoring scheme demonstrated in FIG. 4E, wherein ranking and/or timing can be dependent on the selected partner, are not included in the present examples although tables 12B and 13B can easily tolerate timing and ranking that are interdependent with scoring.

FIG. 14A describes a table that consolidates the results of FIGS. 11B, 12B and 13B, for easing the explanation of the sorting mechanism of step 370 of FIG. 10. It will be emphasized that the current discussion covers the viewpoint of Mary, a kernel subscriber randomly picked in step 354 of FIG. 10. FIG. 14B demonstrates this sorting mechanism by showing how the policy of our kernel subscriber, Mary, affects actual encounter generation by encounter generator 110. Six policy variations #1-6 are described according to the ordering permutations among scoring, ranking and timing. Thus, by prioritizing scoring-timing-ranking (variation #1) Mary & John score highest (14), the preferred mutual timing for them is Tuesday (13), and their mutually-preferred attraction is Garden Café (13) leading encounter generator 110 to generate an encounter that combines these three choices. Swapping the priorities of timing and ranking (variation #2) does not change the encounter specifics in this case. Variations #3-6 further demonstrate how the policy has affects encounter generation as derived from the table of FIG. 14A.

It will be noted that secondary priorities within the policy (i.e. the content of 2nd and 3rd elements) may affect the end results in two ways: when two 1st-priority items have identical points, then the selection can be determined by a secondary element; and when there is an interdependency between timing, ranking and/or scoring (e.g. Garden Café is closed on Tuesdays). Another point to notice is that the present exemplary doctrine of FIG. 10, of picking kernel subscribers, fairly takes into account the scoring, ranking and timing of the other subscribers through selecting mutual criteria, but ignores their policies. It will also be noted that the ensembles demonstrated above were of two subscribers, but similar mechanisms can also be used to arrange group encounters, for example by selecting a kernel subscriber and then identifying all group combinations that include the kernel subscriber, and weigh-in the mutual scoring, ranking and timing for each combination, to derive the best combination for an encounter with the kernel subscriber.

It will be noted that scoring and ranking, that have been measured above in the scale of 0-9, can be measured in many alternative ways, e.g. scale 0-3 or using nonnumeric terms such as 'dislike', 'neutral', 'like', 'like very much' (nonnumeric terms may be translated by processor 160 to numeric values to ease calculations). In the extreme case, scoring and/or ranking can be measured in a binary scale of '0' or '1', which imply 'disinterested' or 'interested'.

Partial Wish-Lists

A wish-list is complete if it includes, for every participant, his, her or their scores, ranks, timing, policy and miscellaneous preferences. However, embodiments or operational instances of the present invention can function well even with incomplete wish-lists, where the missing elements are either derived from default values or call for negotiations among picked ensemble members.

Scoring can be eliminated from some embodiments or specific sessions of the present invention. A first example is a closed forum of friends or business associates who want to meet each other systematically and call the system of the present invention to facilitate the attraction selection and schedule coordination. A second example is where a series of introductory meetings among groups of strangers are devised to acquaint friend seekers or mate seekers with each other, while still being responsive to their timing and ranking.

Ranking can be eliminated from some embodiments or specific sessions of the present invention. For example, a forum may be assembled in order to visit a prescribed session of theater shows or lectures, leaving the coordination of schedules and ensembles to an embodiment of the present invention. In embodiments or events in a forum of friend seekers or mate seekers, some or all attractions may be made mandatory by the organizer thus voiding their ranking.

Timing can be eliminated from some embodiments or specific sessions of the present invention. For example, a forum can be assemble for attending an art lecture every Tuesday evening, while participants can still call an embodiment of the present invention to assist them in selecting with whom they want to go and to what specific lecture. In the case of friend seekers and mate seekers, meetings can be prescheduled. In other embodiments, the schedule is implicit within the attraction specification (e.g. a unique concert) and timing thus becomes redundant. In another embodiment, subscribers who are matched to a specific attraction by scoring and ranking, are advised to call each other to coordinate the schedule.

Policy can be eliminated from some embodiments or specific sessions of the present invention. For example, the policy can be implicit in the forum goals. Thus, a forum of entertainment seekers can adopt a uniform policy for all its members, e.g. outings once a week, ranking first, timing second, scoring third. A forum of friend seekers or mate seekers can define a default policy of scoring first and ranking second, while timing is eliminated altogether by the meetings being prescheduled.

Miscellaneous preferences come to facilitate reservation and coordination and can be eliminated in many embodiments or instances of the present invention.

Another type of partial information within a wish-list is when attractions are specified only partially, leaving details to be decided-upon among the ensemble members. For instance, if an attraction is specified just as 'a restaurant' or 'a movie', or even as 'Italian restaurant' or 'a comedy', the ensemble members then remain with the burden of discussing and negotiating the specifics. The advantage, however, is that attractions that are described in general terms are statistically much easier to match with others, and then subscribers can benefit from many more outings than in the case that attractions are very narrowly and precisely specified.

Offering Multiple Choices

In some embodiments or operational instances of the present invention, subscribers are called to make choices. For example, when an attraction is only partially-specified, when wish-lists are only partly filled, or when wish-lists fail to perfectly-match.

However, in some embodiments a choice is optionally offered when the system identifies more than one possible match among wish lists, introducing flexibility into encounter generation, which may affect any or all acts of picking an ensemble, assigning an attraction and selecting a schedule. For instance, encounter generator 110 may identify that the wish list of a certain subscriber allows picking that subscriber for a first group visiting a certain movie on Monday, or another group visiting another movie on Wednesday; optionally, that subscriber can be offered, by a message form encounter generator 110, to make a choice, which will be part of finalizing the ensemble picking operation. Similarly, a picked ensemble can be found, by the wish-lists of its members, suitable for meeting both at a certain movie on Monday or at a certain theater show on Wednesday, leaving the choice to be either decided arbitrarily by encounter generator 110 according to a predefined doctrine, determined by the ensemble members' votes called for and received and processed by encounter generator 110, or left to be decided upon by direct communication among the ensemble's members.

Accordingly, in embodiments that support multiple choices, the terms "picking an ensemble", "assigning an attraction" and "selecting a schedule" gain some flexibility, in the sense that multiple choices may be presented to subscribers, to be decided either individually, by voting, or by direct communication.

Integrating with Existing Social Networking and Ticketing Services

There are at least two families of Internet and mobile businesses that are suitable as a basis for implementation of the present invention, after making the appropriate adaptations and enhancements. The first business family is social networking sites specializing in connecting people to each other. The second family is ticketing sites specializing in managing reservations and selling tickets to a variety of leisure & entertainment attractions.

Figure 15:
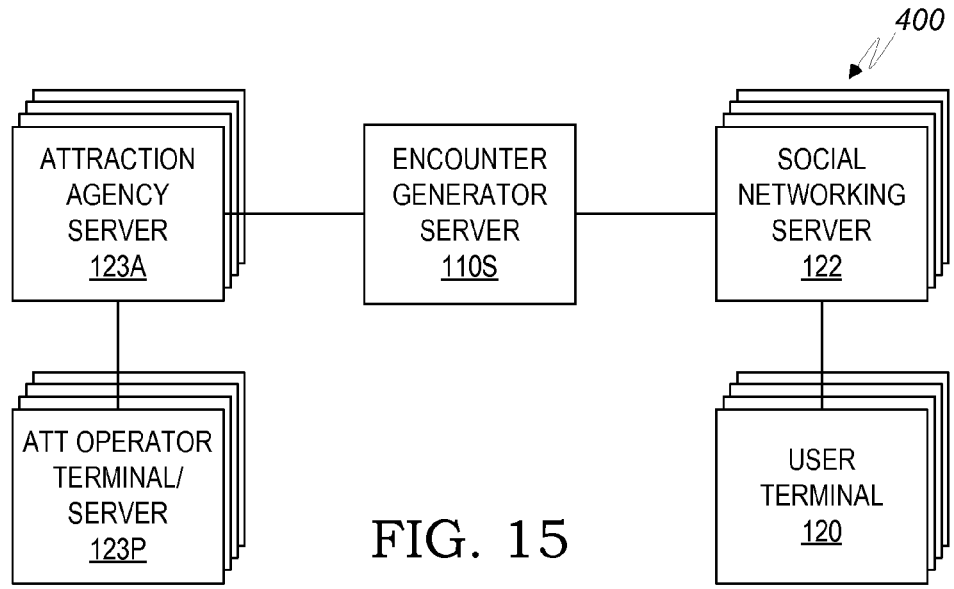
FIG. 15 is a simplified block diagram describing a preferred embodiment of the present invention wherein the invented functionalities are spread over three server families.

FIG. 15 describes an exemplary embodiment 400, where the functionalities of encounter generator 110 of FIGS. 1-2 are spread over an encounter generator server 110S, one or more social networking servers 122 and one or more attraction agency servers 123A. With reference also to FIG. 2, encounter generator server 110S includes processor 160 and encounter program 165 for generating attractions from attraction database 150 that is actually hosted on, or mirrored from, attraction agency servers 123A that in turn are continually fed with updated data from attraction provider terminals/servers 123P. An attraction terminal 123P can be, for example, just a personal computer used by a smaller attraction operator (e.g. a restaurant or bar owner) to enter attractions manually through a Web browser; an attraction server 123P can be used by a larger attraction operator, e.g. a movie theater chain, for maintaining. The encounters are generated by encounter generator server 110S for subscribers listed in one or more social networking servers 122, which maintains communication with the respective subscribers through user terminals 120. Thus, subscriber database 140 preferably mostly resides, in the embodiment 400 under discussion, within the respective social networking server 122, while the respective wish-lists preferably reside in and are maintained and processed by encounter generator server 110S.

The embodiment 400 of FIG. 15 teaches how the present invention can expand and enrich the services of existing businesses in the social networking arena who operate social networking servers 122, and existing businesses in the arena of ticketing who operate attraction agency servers 123A, by providing encounter generator server 110S to bridge between them, and equipping them with the appropriate interfaces and complementary functionalities. The connecting lines are preferably embodied using the Internet and/or a mobile network as a communication channel. Thus members of a social networking server 122 can be offered, on their regular Web page, to join the service of the present invention. When a subscriber select to join, then based on the subscriber's profile, the subscriber is assigned to a forum (possibly a circle) by social networking server 122, which is reported to encounter generator 110S. The subscriber is then presented with a list of attraction offers relayed to the subscriber's viewed Web page from encounter generator server 110S, which selects for presentation the attractions relevant to the subscriber (e.g. by geographic location and age) received from attraction agency servers 123A. When appropriate, the subscriber of server 122 is also presented with a list of appropriate members from his/her/their forum, as discussed above. Then the subscriber is invited to fill-in his, her or their wish-list, that is actually maintained in server 110S. Once encounter generator server 110S has generated an encounter, seat availability is confirmed and seats are tentatively reserved by encounter generator server 110S through attraction agency servers 123A, and the encounter is offered to the participating subscribers of the appropriate social networking server 122 through a message to their user terminals 120. In the message the subscribers preferably find a link, which hooks them directly to the respective through attraction agency servers 123A, for completing the ticketing or reservation, including payment therefor, where appropriate.

Figure 16:
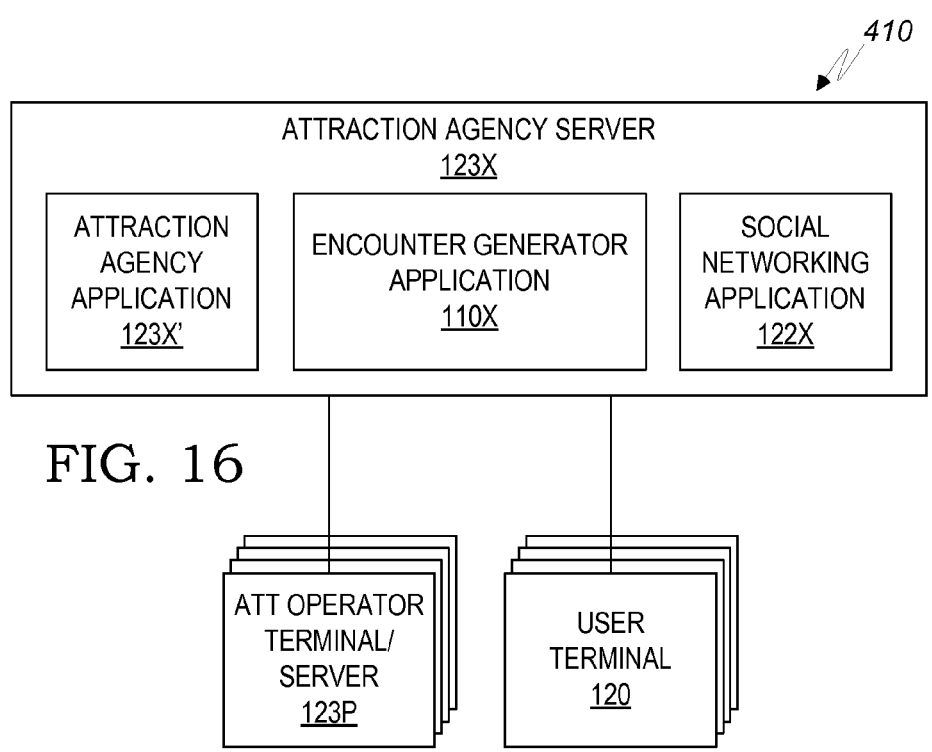
FIG. 16 is a simplified block diagram describing a preferred embodiment of the present invention wherein the invented functionalities are added to an attraction agency server.

FIG. 16 describes an alternative embodiment 410, where the functionalities of encounter generator 110 are implemented within an attraction agency server 123X by adding to it an encounter generator application 110X and social networking application 122X. Thus, attraction agency server 123X runs application 123X' to undertake conventional booking functionalities with attraction operators through their terminals/servers 123P, as well as social networking functionalities 122X (e.g. membership registration, profiles) cooperative with user terminals 120. Thus, a visitor to the respective agency Web site is offered a new subscription service that allows him, her or them to coordinate outings with existing friends, meet new friends or seek a soul mate according to the teachings of the present invention.

Cooperation with Dating Services

Figure 17:
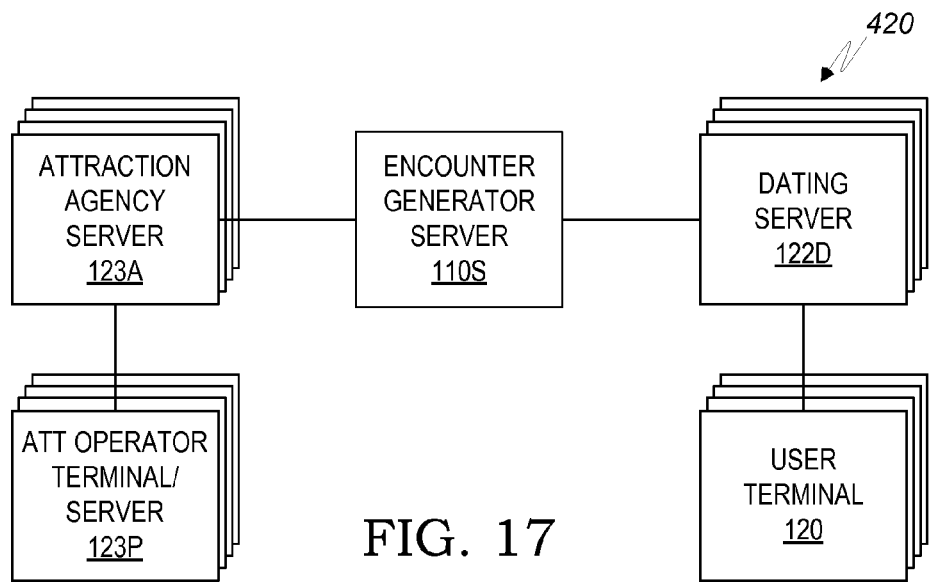
FIG. 17 is a simplified block diagram describing a variation of the embodiment of FIG. 15 adapted for dating.

FIG. 17 echoes FIG. 15, further adapted to a specific exemplary embodiment 420 for mate seekers. Thus, the subscribers who use user terminals 120 are singles, and the associated social networking services are actually Internet (or mobile) dating services that operate dating servers 122D. The other blocks are as described with respect to FIG. 15.

Figure 18:
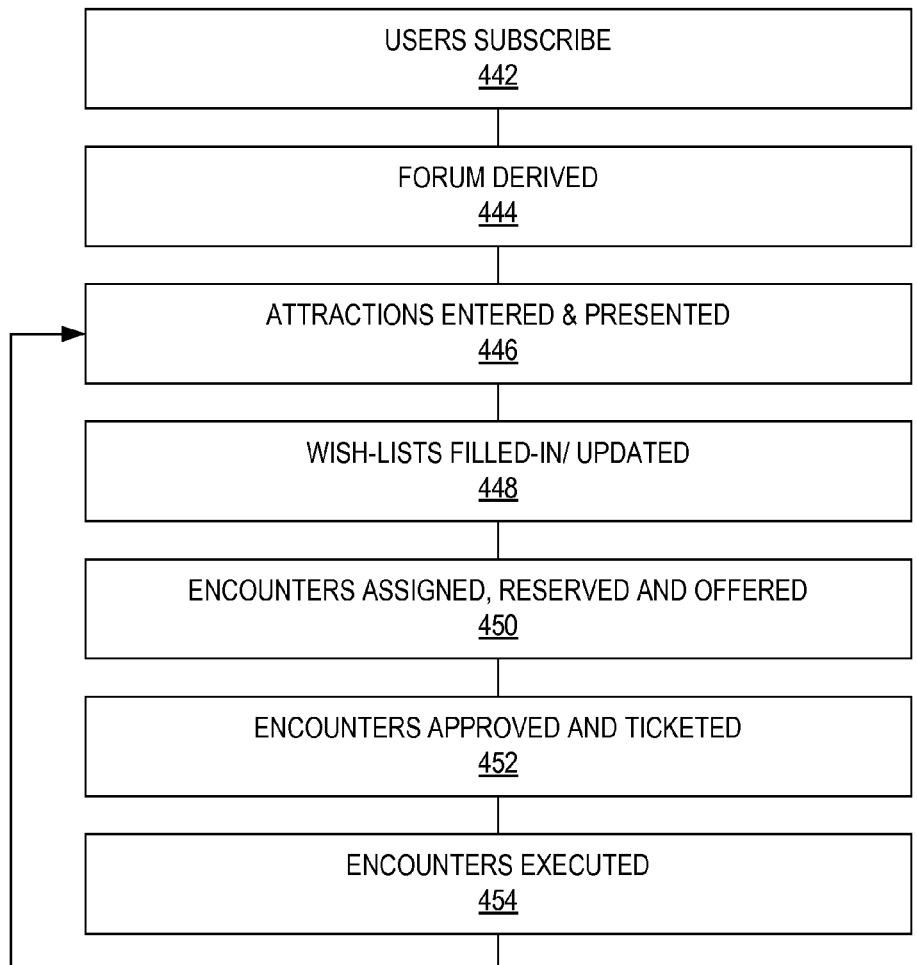
FIG. 18 is a simplified flowchart of the operation of the embodiment of FIG. 17.

FIG. 18 summarizes a preferred operation method of the embodiment of FIG. 17, with reference to a selected dating service operating one of the dating servers 122D. In a step 442 users use their user terminals 120 to subscribe with their selected dating service through the respective dating server 122D, and fill-in their profile. In a step 444 a closed forum of compatible users is derived by the dating service, or a circle is derived for each user, either manually by commonsense, or by using profile-matching techniques that are beyond the scope of the present invention, and the forum members are reported, at least by a unique identification of each, to encounter generator server 110S, along with the profile of the forum (e.g. age range, geography, special interests). In a step 446, attraction agency server 123A sends to encounter generator server 110S attractions received from attraction provider terminals/ servers 123P, and encounter generator server 110S extracts from these attractions those relevant to the forum, derived by the forum profile (e.g. age range, geography, special interests) and by their time relevancy, and the extracted attractions are then forwarded to the respective user terminals 120 through the respective dating service server 122D. In a step 448, the members of the forum, already presented with the available attractions in step 446, use their user terminals 120 to fill-in their wish-lists, to specify their scoring, ranking, timing, policies and miscellaneous preferences, all immediately relayed through dating server 122D to encounter generator server 110S. In a step 450, when all wish-lists of the forum members are received, or when a specified deadline is reached, encounter generator server 110S assigns encounters to ensembles whose wish-lists have matched, makes tentative reservations at the respective attractions through the respective attraction agency servers 123A, and offers the attractions to the ensembles' members by sending messages to their user terminals 120 through the respective dating server 112D. In a step 452, the users approve their participation in the encounters assigned to them, and complete booking, including payment. Step 452 often takes place through visibly or invisibly relaying the user to the respective attraction agency server 123A for completing the payment and ticketing transaction, while keeping dating server 122D and encounter generator server 110S informed. In a step 454 the encounter is executed, i.e. the subscribers of each of the picked ensembles meet and enjoy their mutual time at the assigned attraction. Following such encounters, the process loops back to step 446, to allow selecting new attractions and modifying the wish-lists toward the nest session of encounters.

It will be appreciated that under the operation described in FIG. 18 with respect to the dating embodiment of FIG. 17, the user experience at user terminal 120 is as if the stages of subscription, wish-list fill-in, encounter offers, and booking, are all carried out at one screen on their user terminal 120. Thus, all the messages and transactions that run on or are relayed by encounter generator server 110S and attraction agency server 123A are behind the scene and are transparent to the user. Also, it will be noted that the dating service that runs server 122D does not need to share its user database with encounter generator server 110S, since it is sufficient that dating server 122S shares with encounter generator server 110S only unique user identifications (e.g. by a serial number), some basic profile details (e.g. sex) and the membership of forums/circles. Then, encounter generator server 110S exclusively manages the wish-list and history log of all subscribers for generating encounters. This aspect is commercially important for dating services when encounter generator server 110S is run by another business entity that that of the dating server 122D. In addition, it will be noted that monetary transactions in step 452 are preferably channeled to be executed directly between the user and the agency server 123A, to make the system more efficient and secure as credit card numbers do not need to be divulged to additional parties except the buyer and the seller.

Examplary Doctrines for Singles

Figure 19:
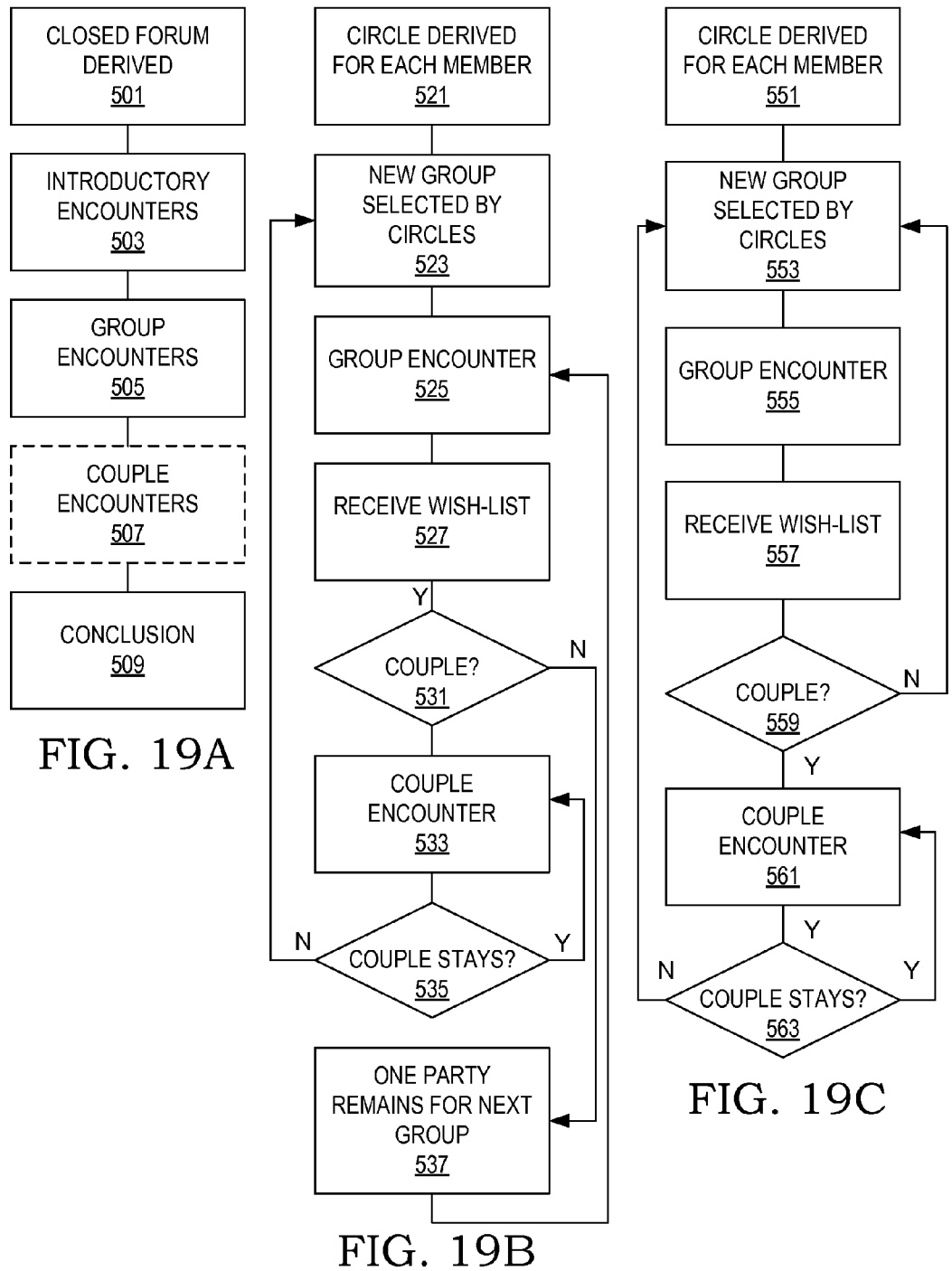
FIGS. 19A-C are simplified flowcharts describing alternative doctrines for the operation of the embodiment of FIG. 17.

FIGS. 19A-C schematically illustrate three exemplary modes of operation of the dating embodiment of FIG. 17, which differ by the way a forum is derived and the game rules. The three doctrines represented by FIGS. 19A-C offer different social and psychological merits, and can be chosen by a dating service, or be offered for the choice of the participants.

FIG. 19A describes the operation of a closed forum, and is similar to the operation described with respect to FIG. 18. Thus, in a step 501 a closed forum of, for example, 15 women and 15 men, is derived by the dating service. In a step 503 a series of short introductory meetings is run to introduce all men to all women in the forum, disallowing or ignoring scoring at this stage. In a step 505 a series of primary group encounters, in small groups of preferably 3-6 subscribers, is run to better acquaint the members to each other and ignite mutual interest among individuals. Those who develop mutual interest or just feel comfortable with each other and express their willingness to meet on a one-on-one basis in their wish-lists (see blocks 145S and 145C of FIG. 3), move to couple encounters 507. After a predefined number of encounters, and/or a period of time, and/or when the scoring stabilizes across the forum, the forum is concluded in a step 509, with some members becoming couples, some others getting closer and are offered to move together to a fresh forum, and the rest are offered another try with new acquaintances.

FIG. 19B describes an alternative mode of operation of revolving groups of four, until a match is found and a couple is established. The crux of the present embodiment is that each participant will meet one of the present others of the opposite sex in the next group meeting, until he or she identifies (and is mutually identified by) a partner for couple meetings. In a step 521 the dating service derives a circle of prospects for each forum member. For example, for a specific male member who is 30 years old, all women who are in 25-30 age range, have a similar level of education and live within 10 miles from that man, constitute that man's circle. It will be noted that circles vary in their size, which can range from a few prospects to hundreds of them. The circle is preferably derived by the dating service that operates dating server 122D, which has the full profile of all subscribers, and the unique identifiers of all circle members for each subscriber, including the circle characteristics, are reported to the encounter generator server 110S for managing the encounters. Steps 523-537 below will be described from the viewpoint of a selected kernel subscriber, that has been just picked randomly by encounter generator server 110S. In a step 523 encounter generator server 110S is called to select three other subscribers for a group encounter. Two subscribers of the opposite sex of the kernel subscriber are randomly selected from that subscriber's circle, and another subscriber of the same sex as the kernel subscriber is selected from the intersection of the circles of the selected two of the opposite sex. Now a compatible group of two men and two women has been formed. In a step 525, encounter generator server 110S matches an attraction and timing and a group encounter is arranged and executed by the four subscribers. Following the encounter, the participants are invited to update their wish-lists, which is received in a step 527 by encounter generator server 110S. The scores, in the embodiment of FIG. 19B, do not allow absolute exclusion of any partner (i.e. score '0'), but accepts relative liking, as well as an indication whether the scored participant is desired for a couple meeting. In a step 529 encounter generator server 110S processes the wish-lists from step 527 and divides the group into two pairs according to predefined "best match" criteria; if such criteria exactly balance, then encounter generator server 110S selects the two pairs randomly. Focusing back on the kernel subscriber, in a step 531 encounter generator server 110S checks whether the kernel subscriber and his/her partner have mutually scored each other for a couple encounter (see for example block 145C of FIG. 3). If the answer is positive, then in a step 533 encounter generator server 110S arranges a couple encounter for that pair, and through step 535 it arranges additional couple encounters for same pair until they either decided to retire as a couple (not shown) or separate (by a score of '0' of at least one of them) and then the kernel subscriber is selected for another new group of four in step 523. If in step 531 there was no couple selection, then in a step 537 the kernel subscriber and the other party of the pair become part of a new group of four and are invited to another group encounter in step 525.

The mode of operation of FIG. 19C starts similarly to that of FIG. 19B, in a circle derived for each member of a dating service by the dating service and reported to encounter generator server 110S. In a step 553, a group of four compatible subscribers is selected, similarly to step 523 of FIG. 19B. In a step 555 a group encounter is arranged by encounter generator server 110S and is executed by the group. In a step 557 the participants, under the impressions from their group encounter, submit their wish-lists to encounter generator server 110S. If two participants identified in their mutual scores sufficient liking for meeting as a couple, then they are assigned a couple encounter in a step 561, after which, through examining the updated wish-lists, are either sent in a step 563 by encounter generator server 110S for another couple encounter, or are separated and get another opportunity in a group meeting in step 553. If one failed to obtain a partner in step 561, he or she is referred for another new group meeting in step 553.

The operational modes of FIGS. 19A-C differ by the level that they demand getting to know each other before establishing an opinion and developing interest. Those who believe in getting and giving a second look will prefer the mode of FIG. 19A, while those who believe that they will find their desired mate only by screening hundreds of prospects will prefer the mode of FIG. 19C. It is the discretion of the dating service which modes of operation are worth offering to its subscribers, or a choice of subscribers which mode of operation they prefer. Sometimes, however, a subscriber who prefers massive screening may learn that the type of personality he is seeking for his soul mate prefers closed forum encounters, and may adapt his preferences accordingly.

Summary of Encounter Generation

Figure 20:
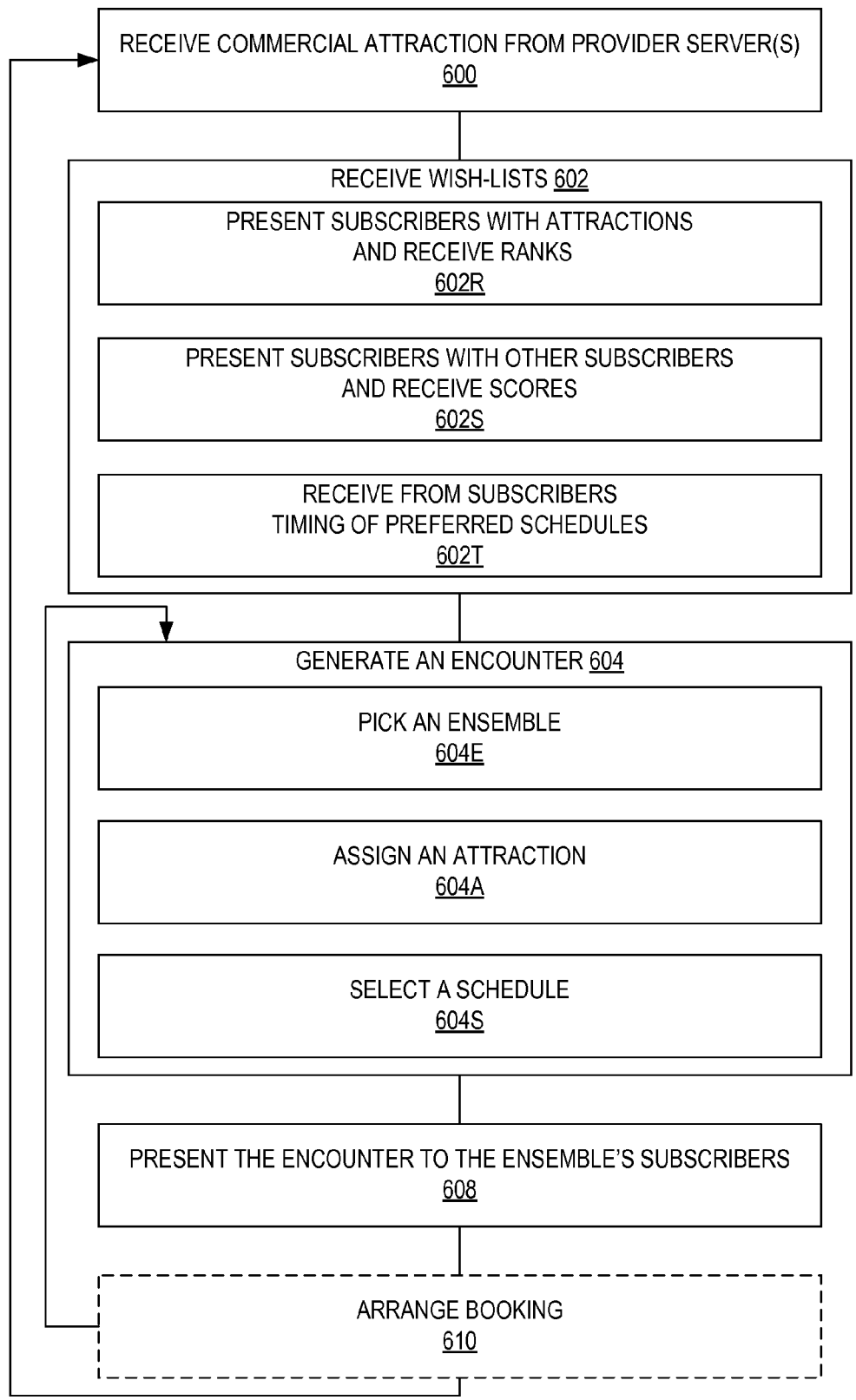
FIG. 20 is a simplified flowchart describing a generalized mode of operation of a preferred embodiment of the present invention that offers commercial attractions.

FIG. 20 summarizes the operation of the present invention for offering commercial attractions as a motive or facility for social meetings. The procedure of FIG. 20 presumes that subscribers have already registered with a community of the present invention and that each subscriber has already been identified with other subscribers that can be selected for an encounter with that subscriber (i.e. forums/circles have been already formed within the community, as appropriate), and has also entered his/her/their policy, or that such policy has been mandated by the community. The description below refers also to FIGS. 1-2.

In a step 600, encounter generator 110 receives offers for commercial attractions from one or more commercial attraction provider servers 123, that can be attraction agency servers, attraction operator server or attraction operator terminal. In a step 602, encounter generator 110 receive subscribers' wish-lists by communicating with the respective subscriber terminals 120. Step 602 is composed of three sub-steps: in a step 602R, subscribers are presented with attraction offers, preferably narrowed to relevant attractions only (relevancy determined, for example, by age, geography, and possibly fields of interest included in the subscriber's profile; presenting only relevant attractions is an optional convenience feature, to ease selection) and rank their interest in these attractions. In a step 602S each subscriber is presented with a list of relevant other subscribers, for example from his or her closed forum of from his or her circle, and scores his or her interest in meeting them. In the case of mate seekers the relevant other subscribers are individuals of the selected gender, while in other cases they can be men, women, couples or families, as explained above. As already explained, scoring and ranking can optionally be allowed to be interdependent so that one may rank high preference for a movie with one prospect and high preference for a concert with another. In a step 602T each subscriber fills-in his or her timing with respect to preferred schedules for outings. It will be noted that while often a wish-list 602 includes all three of ranking 602R, scoring 602S and timing 602T, it is also possible that only one or two out of the three are required or entered, where the missing factor being defined by a default value or left for being negotiated among the selected parties (for example, when scoring and ranking has selected two subscribers for a specific movie, and they are left with the decision on when to go out for that movie). Also, if an attraction is specified in general terms (for example, just 'a movie' or 'a restaurant'), it is expected that the particulars will be agreed upon among the attraction visitors.

After encounter generator 110 has received in step 602 the wish-lists of community members, in a step 604 it processes those wish-lists for generating an encounter by the methods described above. The encounter generation 604 includes picking an ensemble of subscribers 604E, assigning an attraction 604A, and selecting a schedule 604S. The priority among picking an ensemble, assigning an attraction and selecting a schedule may be a matter of subscribers' policy (see for example FIG. 14B). While in many cases, picking 604E is decided by matching high mutual scores 602S, in some other cases it can be decided by mutual ranks 602R or by mutual timing 602T (for example, within a forum of friends who decide to adopt a policy of picking ensembles on the basis of mutual interest in attractions or on calendar availability, while being tolerant regarding the companions). Similarly, the assigned attraction 604 is preferably selected on the basis of mutual ranking 602R of the ensemble's members, but can alternatively be picked randomly or systematically within a predefined list of attraction, for example within a forum that decides to systematically visit old movies or all restaurants in China Town. In some cases, an encounter generated at step 604 includes all three of ensemble, attraction and schedule; in some other cases (if supported by the doctrine and rules 171 for the instant community) an attraction or schedule may be missing and left for negotiation among the ensemble members, for example when the corresponding data from the respective wish-lists 602 are missing or where such data fail to match (e.g. one wishes to go out on Tuesday while the designated partner prefers Wednesday).

In a step 608 the encounters generated in step 604 are presented to the picked subscribers by communicating with their respective terminals 120, e.g. by an email or SMS message. Preferably, the subscribers are requested to confirm the receipt of the message and their participation. In some cases mentioned above, the ensemble's subscribers are encouraged to communicate with each other in order to finalize some missing or incomplete details such as attraction specifics or schedule.

In an optional step 610, the picked subscribers who have been presented with their encounter in step 608, are offered on their terminal 120 an option to complete booking (i.e. reservation and/or ticketing), which is executed either through encounter generator 610, or by the subscriber terminal 120 being directed by encounter generator 160 (e.g. by providing a link) to the respective attraction server 123 so that the commercial transaction, as well as handling the associated confidential credit card data and the associated commercial liabilities, are managed directly between the subscriber (the buyer) and the respective attraction provider (the seller). The choice between reservations and ticketing depends on the nature of the selected commercial attraction. For example, a restaurant will usually require reservation, a movie may require ticketing, and some theaters may allow either direct ticketing or a reservation completed by ticketing at the theater gate.

The process of steps 604-608 or 604-610 repeats for generating encounters for as many subscribers as possible from those who have provided their wish-list in step 602 and can be matched with others for an encounter. However, some subscribers who have provided their wish-lists in step 602 may be left without an encounter since encounter generator 110 could not match them with other subscribers on the basis of mutual scoring, ranking and timing. As mentioned above, in some embodiments, partial matches (when either the schedule or the attraction cannot be matched) among subscribers who have positively scored each other, can be still presented in step 608 for negotiations among the picked subscribers ('among' includes 'between' for a case of two subscribers).

The full process of FIG. 20 (steps 600-608 or 600-610) is repeated periodically to generate encounters for next specified periods, e.g. for the next week.

ADVANTAGES

The present invention highly increases the market size for the leisure & entertainment industries, by nurturing the social motive that drives outings or may inhibit them. It targets the market of everyone who seeks leisure & entertainment on the one hand, and the company of others on the other hand. Customized variations are optimized for individuals, couples and families who seek more outings with existing friends; individuals, couples and families who wish to make new friends; and individuals who seek a soul mate.

The present invention offers, on the one hand, highly-increased sales to the leisure & entertainment industries, and on the other hand, joy to almost every individual, couple and family, through having many more outings while enriching and strengthening their social connections.

While the invention has been described with respect to a limited number of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

What is claimed is:

1. A system usable by an attraction provider for merchandising commercial attractions to a community of subscribers, the system comprising: (i) an attraction provider server, and (ii) an encounter generator server; said attraction provider server and said encounter generator server configured to cooperate for merchandising commercial attractions to subscribers of the community by:
    said attraction provider server providing commercial attractions to said encounter generator server;
    said encounter generator server receiving commercial attractions from said attraction provider server and storing the received commercial attractions in an attraction database;
    said encounter generator server presenting commercial attractions provided by said attraction provider server to subscriber terminals of subscribers of the community, and receiving, from a subscriber terminal of each participating subscriber of a plurality of participating subscribers of the community, a ranking of said each participating subscriber's interest in commercial attractions provided by said attraction provider server;
    a processor of said encounter generator server generating an encounter by:
        picking from said plurality of participating subscribers, in response to at least said rankings received from said plurality of participating subscribers, an ensemble of at least two subscribers and less than said plurality of participating subscribers, and
        assigning to said ensemble an assigned attraction from the commercial attractions provided by said attraction provider server; and
    said attraction provider server booking said assigned attraction for said ensemble.

2. The system of claim 1, wherein said attraction provider is an attraction operator.

3. The system of claim 1, wherein said attraction provider is an attraction agency.

4. The system of claim 1, wherein said encounter generator server is also receiving, from a subscriber terminal of each said participating subscriber, a scoring of said participating subscriber's relative level of interest in each of a plurality of other subscribers of the community, and said picking is responsive also to said scorings received from said plurality of participating subscribers.

5. A computerized method usable by an attraction provider for merchandising commercial attractions to a community of subscribers, the method executed cooperatively by an attraction provider server and an encounter generator server, the method comprising:
    said attraction provider server providing commercial attractions to said encounter generator server;

said encounter generator server receiving commercial attractions from said attraction provider server and storing the received commercial attractions in an attraction database;

said encounter generator server presenting commercial attractions provided by said attraction provider server to subscriber terminals of subscribers of the community, and receiving, from a subscriber terminal of each participating subscriber of a plurality of participating subscribers of the community, a ranking of said each participating subscriber's interest in commercial attractions provided by said attraction provider server;

a processor of said encounter generator server generating an encounter by:
  picking from said plurality of participating subscribers, in response to at least said rankings received from said plurality of participating subscribers, an ensemble of at least two subscribers and less than said plurality of participating subscribers, and
  assigning to said ensemble an assigned attraction from the commercial attractions provided by said commercial attraction server; and
said attraction provider server booking said assigned attraction for said ensemble.

6. The method of claim 5, wherein said attraction provider is an attraction operator.

7. The method of claim 5, wherein said attraction provider is an attraction agency.

8. The method of claim 5, further comprising:
said encounter generator server receiving, from a subscriber terminal of each said participating subscriber, a scoring of said participating subscriber's relative level of interest in each of a plurality of other subscribers of the community; and
wherein said picking is responsive also to said scorings received from said plurality of participating subscribers.

* * * * *